(12) United States Patent
Kaimal et al.

(10) Patent No.: US 11,891,330 B2
(45) Date of Patent: Feb. 6, 2024

(54) APPARATUS AND METHODS FOR FORMING COLORED MARKS ON AN OPTICAL FIBER USING MULTIPLE INK STREAMS

(71) Applicant: CORNING INCORPORATED, Corning, NY (US)

(72) Inventors: Aditya Kaimal, Wilmington, NC (US); Kelvin Nguyen, Fort Worth, TX (US); Darren Andrew Stainer, Wrightsville Beach, NC (US)

(73) Assignee: Corning Incorporated, Corning, NY (US)

( * ) Notice: Subject to any disclaimer, the term of this patent is extended or adjusted under 35 U.S.C. 154(b) by 328 days.

(21) Appl. No.: 17/139,083

(22) Filed: Dec. 31, 2020

(65) Prior Publication Data
US 2021/0206694 A1 Jul. 8, 2021

Related U.S. Application Data

(60) Provisional application No. 62/956,913, filed on Jan. 3, 2020.

(51) Int. Cl.
*B41J 3/407* (2006.01)
*B41J 2/02* (2006.01)
(Continued)

(52) U.S. Cl.
CPC .............. *C03C 25/143* (2013.01); *B41J 2/02* (2013.01); *B41J 3/407* (2013.01); *B41M 5/0088* (2013.01);
(Continued)

(58) Field of Classification Search
CPC . C03C 25/143; C03C 25/106; C03C 25/1065; B41J 2/02; B41J 3/407;
(Continued)

(56) References Cited

U.S. PATENT DOCUMENTS

| 2,929,136 A | 3/1960 | Andren |
| 3,021,815 A | 2/1962 | Burke et al. |

(Continued)

FOREIGN PATENT DOCUMENTS

| DE | 102004029649 A1 | 3/2006 |
| EP | 0166925 A1 | 1/1986 |

(Continued)

OTHER PUBLICATIONS

International Search Report and Written Opinion of the International Searching Authority; PCT/US2020/064405; dated Mar. 17, 2021, 16 pages; European Patent Office.

*Primary Examiner* — Yaovi M Ameh
(74) *Attorney, Agent, or Firm* — Kevin L. Bray

(57) ABSTRACT

The system and methods for marking an optical fiber with color-coded marks disclosed herein include forming closely spaced multiple ink streams, with at least two of the ink streams having different colors. The optical fiber moves over a fiber path that resides adjacent the ink streams. The fiber path and the ink streams are made to briefly intersect so that the ink streams form on the outer surface of the optical fiber a group of spaced apart individual marks, wherein the group of individual marks constitute a color-coded mark. Repeating this marking process at different times as the fiber moves over the fiber path forms spaced apart color-coded marks along the length of the fiber. Subsequent drying and overcoating of the marks fixes and protects the color-coded marks.

19 Claims, 19 Drawing Sheets

(51) Int. Cl.
  *C03C 25/143* (2018.01)
  *B41M 5/00* (2006.01)
  *B41M 7/00* (2006.01)
  *C03C 25/106* (2018.01)
  *C03C 25/1065* (2018.01)
  *G02B 6/44* (2006.01)

(52) U.S. Cl.
  CPC ......... *B41M 7/0045* (2013.01); *C03C 25/106* (2013.01); *C03C 25/1065* (2013.01); *G02B 6/4482* (2013.01); *G02B 6/4486* (2013.01)

(58) Field of Classification Search
  CPC ...... B41J 2/175; B41J 11/0015; B41J 11/002; B41M 5/0088; B41M 7/0045; B41M 5/0047; B41M 5/0064; G02B 6/4482; G02B 6/4486
  See application file for complete search history.

(56) References Cited

U.S. PATENT DOCUMENTS

| | | | |
|---|---|---|---|
| 3,434,456 A | 3/1969 | Geating | |
| 3,595,994 A | 7/1971 | Whitman | |
| 3,709,432 A | 1/1973 | Robertson | |
| 3,807,025 A | 4/1974 | Gudmestad | |
| 4,190,844 A | 2/1980 | Taylor | |
| 4,619,842 A | 10/1986 | Moss et al. | |
| 4,629,285 A * | 12/1986 | Carter | G02B 6/04 385/128 |
| 4,881,489 A | 11/1989 | Klebl et al. | |
| 5,119,464 A | 6/1992 | Freychet et al. | |
| 5,151,306 A | 9/1992 | Andrews et al. | |
| 5,377,292 A | 12/1994 | Bartling et al. | |
| 5,645,899 A * | 7/1997 | Unterberger | B41M 7/0081 347/43 |
| 5,796,905 A | 8/1998 | Hoffart et al. | |
| 6,404,972 B1 | 6/2002 | Pasch et al. | |
| 6,576,591 B1 | 6/2003 | Snowdon et al. | |
| 6,650,815 B2 | 11/2003 | Hawtof et al. | |
| 6,866,370 B2 | 3/2005 | Jeanmaire | |
| 7,072,554 B2 | 7/2006 | Watanabe et al. | |
| 8,104,879 B2 | 1/2012 | Barbet | |
| 8,768,128 B1 | 7/2014 | Garner et al. | |
| 8,865,005 B2 | 10/2014 | Garcia Da Fonseca et al. | |
| 10,801,883 B2 | 10/2020 | Dunn et al. | |
| 2004/0028366 A1* | 2/2004 | Watanabe | G02B 6/4482 385/128 |
| 2004/0042747 A1* | 3/2004 | Kim | C03B 37/0253 385/123 |
| 2006/0100736 A1* | 5/2006 | Kamata | H01B 13/345 700/123 |
| 2015/0352861 A1* | 12/2015 | Yagi | B41J 2/175 347/85 |
| 2017/0045706 A1 | 2/2017 | Carberry et al. | |
| 2020/0215825 A1 | 7/2020 | Nguyen et al. | |

FOREIGN PATENT DOCUMENTS

| | | |
|---|---|---|
| EP | 09-171726 A | 6/1997 |
| EP | 1219428 A2 | 7/2002 |
| WO | 01/46738 A1 | 6/2001 |
| WO | 2007/133421 A1 | 11/2007 |

* cited by examiner t = t1 t = t2 t = t1

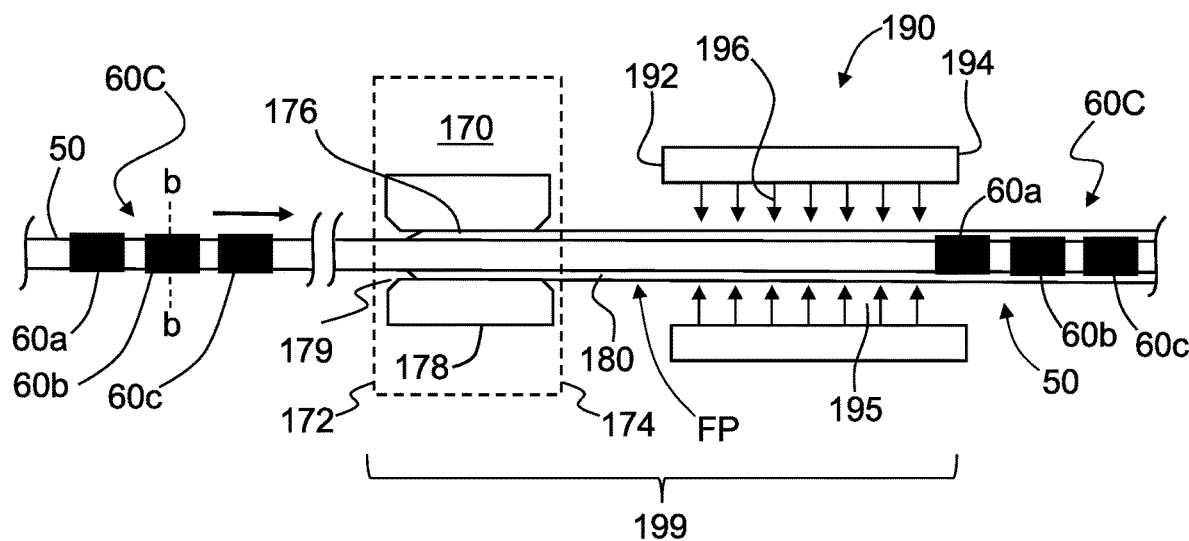
FIG. 9
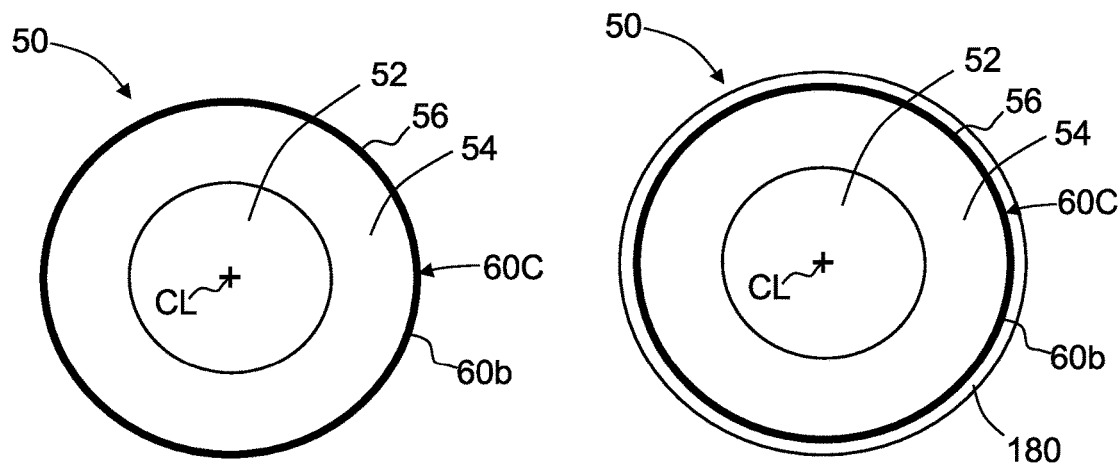
FIG. 10  FIG. 11

APPARATUS AND METHODS FOR FORMING COLORED MARKS ON AN OPTICAL FIBER USING MULTIPLE INK STREAMS

This application claims priority under 35 USC § 119(e) from U.S. Provisional Patent Application Ser. No. 62/956,913, filed on Jan. 3, 2020, and which is incorporated by reference herein in its entirety.

FIELD

The present disclosure relates to optical fibers, and in particular relates to apparatus and methods for forming colored marks on an optical fiber using multiple ink streams.

BACKGROUND

Optical fiber cables are used extensively in optical telecommunications systems. Certain types of optical fiber cables used for transmitting large amounts of data include many individual optical fibers, with the fiber count ranging from just a few to hundreds, depending on the particular application. A coding scheme can be employed so that the individual optical fibers can be identified. Such coding schemes can include fiber color or individualized markings on the outer surface of the optical fibers.

Ink jet printing can be used to form colored markings on an optical fiber. Ink jet printing uses an ink jet printing head that shoots small droplets of ink directly at the moving optical fiber. While ink jet printing works at relatively slow fiber speeds (e.g., 2 meters per second or slower), at the higher speeds now being used in optical fiber marking systems, marking errors (i.e., missing marks, incorrectly formed marks, etc.) become problematic. In particular, relatively high fiber speeds can cause the optical fiber to vibrate to the point where the ink droplets from the ink jet printing head miss the optical fiber.

SUMMARY

The apparatus and methods disclosed herein generally include moving an optical fiber over a fiber path that includes a marking location defined by a marking unit. The marking unit is configured to dispense marking material in the form of multiple (i.e., two or more) closely arranged streams of marking material, referred to herein generally as ink streams. The ink streams reside adjacent the fiber path. Color-coded marks are produced on the optical fiber by adjusting the fiber path (i.e., the position of the optical fiber) or the position of two or more adjacent ink streams so that the optical fiber at least partially intersects the two or more adjacent ink streams for a short time duration. This causes the different colored inks from the ink streams to coat respective axial lengths of the optical fiber over at least a portion of its outer surface as the optical fiber moves over the fiber path. At least two of the two or more ink streams have a different color (which can include black and as well as shades of gray), thereby allowing for color-coded marking of the fiber. In some examples, the individual marks can have different lengths. The individual marks formed by the adjacent ink streams are relatively close together and form a group of marks, referred to herein as a "color-coded mark." The color-coded marks can be formed along the fiber at spaced apart intervals, which can be regular (periodic) or can vary in a select way.

In an example, the individual marks are ring marks that cover the local circumference of the optical fiber. Also in an example, a fiber positioning device having a position adjustment feature (e.g., a protrusion, an eccentric portion, etc.) is used to move the fiber path (i.e., the path over which the optical fiber moves) into the ink stream at the marking location. In another example, the marking units include an ink stream deflector device that deflects the ink streams into the fiber path at the marking location.

The color-coded marked optical fiber can then be further processed, e.g., the individual marks can be dried and then a protective overcoat added to protect the color-coded marks from wear and tear. The protective overcoat can be transparent and colored (tinted) to provide additional visibility and/or for identification. The color-coded marking systems and methods can be applied directly after drawing the optical fiber or later in the process of defining the final form of the optical fiber.

In various examples, the color-coded marking systems and methods disclosed herein enable the speed of the optical fiber over the optical path (i.e., the fiber speed or line speed) to be relatively high, e.g., greater than 2 meters per second (m/s) or greater than 5 m/s or greater than 10 m/s, or greater than 20 m/s or greater than 30 m/s or greater than 40 m/s or greater than 50 m/s.

Because each ink stream is continuous, the process window for forming color-coded marks is much larger than for inkjet printing of such marks because there is no need to control or direct small ink droplets from an inkjet printer head onto the outer surface of the optical fiber. In addition, the quality of the marks is generally better than those obtained using inkjet-based marking. The use of ink streams allows for many different types of inks to be used, including those having a relatively wide range of viscosities.

An embodiment of the disclosure is directed to a method forming a color-coded mark on an optical fiber having an outer surface and a center line that defines an axial direction of the optical fiber, comprising: forming two or more ink streams that reside substantially in a row and in close proximity to one another, with at least first and second ones of the two or more ink streams having first and second colors that are different from one another; moving the optical fiber over a fiber path that resides adjacent the two or more ink streams; and causing the fiber path and the two or more ink streams to briefly intersect to form two or more axially spaced apart marks on the outer surface of the optical fiber, with at least first and second ones of the two or more axially spaced apart marks having the first and second different colors of the first and second ink streams.

Another embodiment of the disclosure is directed to a method of marking an optical fiber with a color-coded mark, comprising: causing the optical fiber to move over a fiber path, wherein the moving optical fiber has an outer surface, and wherein the fiber path resides adjacent multiple ink streams arranged closely proximate each other, wherein at least two of the multiple ink streams have a different first and second colors; forming on the outer surface of the moving optical fiber multiple spaced apart wet ink marks by causing the fiber path and the multiple ink streams to briefly intersect, wherein at least two of the spaced apart wet ink marks have the first and second different colors; drying the multiple spaced apart wet ink marks at a drying location to form dried spaced apart ink marks that constitute the color-coded mark; and applying a substantially transparent protective coating over the dried ink marks and the outer surface of the moving optical fiber, wherein the dried ink marks are visible through the substantially transparent protective coating.

Another embodiment of the disclosure is directed to an optical fiber marking apparatus for marking an optical fiber having an outer surface, comprising relative to a fiber path: a payout module and a take-up module respectively configured to pay out and take up the optical fiber while moving the optical fiber over the fiber path at a fiber speed; a marking unit disposed downstream of the payout module and at a marking location, the marking unit configured to form multiple ink streams adjacent the fiber path, with at least two of the multiple ink streams having different colors; and a fiber positioning device operably disposed relative to the marking unit and that is adapted to intermittently position the optical fiber to intersect the multiple ink streams so that ink from the multiple ink streams forms groups of spaced apart marks on the outer surface of the optical fiber at the marking location, wherein each group of spaced apart marks constitutes a color-coded mark.

Another embodiment of the disclosure is directed to an optical fiber marking apparatus for marking an optical fiber having an outer surface, comprising relative to a fiber path: a payout module and a take-up module respectively configured to pay out and take up the optical fiber while moving the optical fiber over the fiber path at a fiber speed; a marking unit disposed downstream of the payout module and at a marking location, the marking unit configured to form multiple ink streams adjacent the fiber path, with at least two of the multiple ink streams having different colors; and at least one ink stream deflection device operably disposed relative to the multiple ink streams and that is adapted to intermittently deflect the multiple ink streams to intersect the optical fiber so that the multiple ink streams form groups of spaced apart marks on the outer surface of the optical fiber at the marking location, wherein each group of spaced apart marks constitutes a color-coded mark.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 9 is a close-up view of the portion of the optical fiber marking apparatus that includes an overcoat applicator and a curing system that together define an overcoating system.

FIG. 10 is a cross-sectional view of the color-coded marked but uncoated optical fiber as taken along the line b-b in FIG. 4 at a location of a mark.

FIG. 11 is similar to FIG. 10 and illustrates the color-coded marked optical fiber with a protective overcoat.

DETAILED DESCRIPTION

Figure 1A:
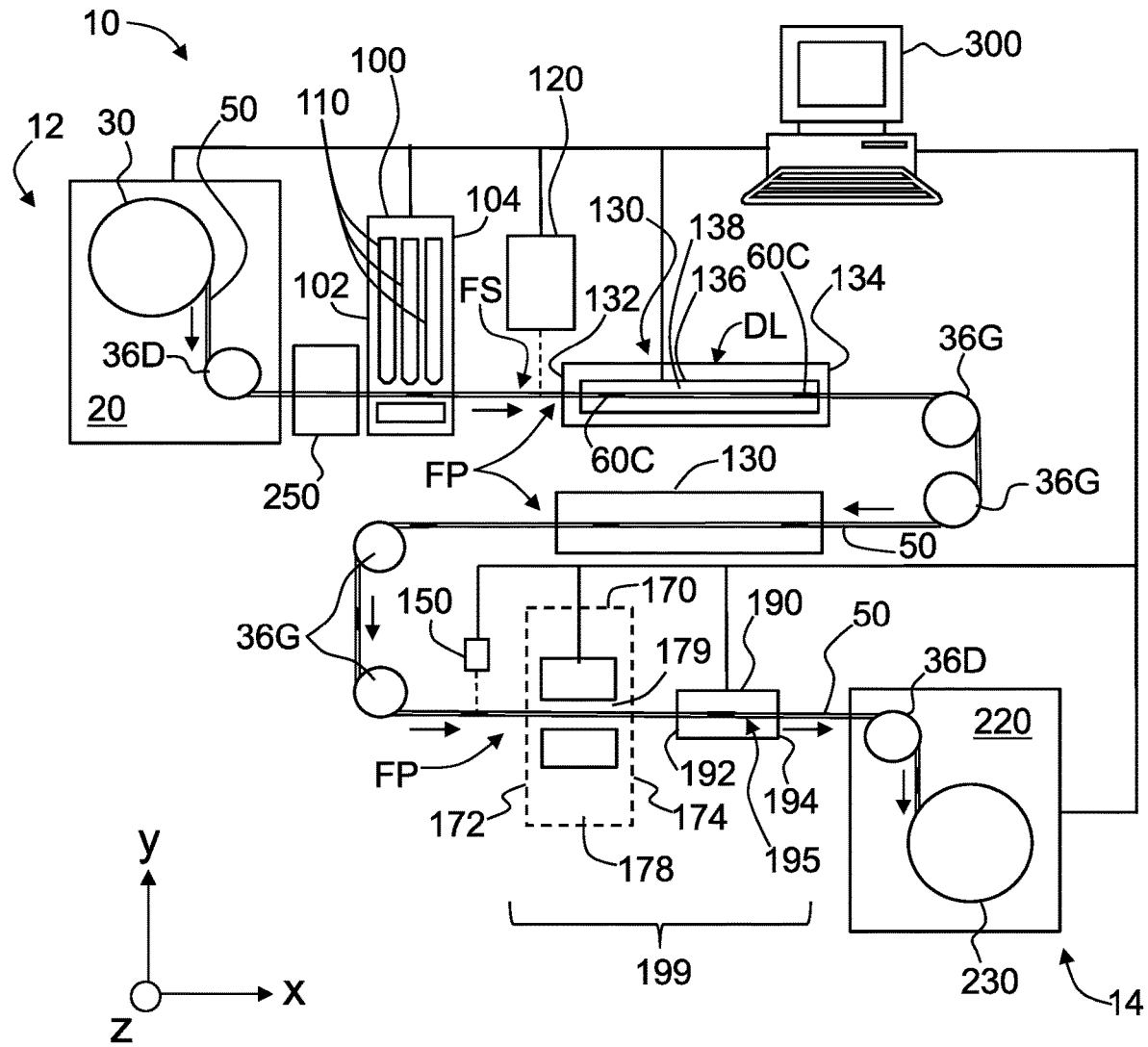
FIG. 1A is a schematic diagram of an example high-speed optical fiber marking apparatus ("apparatus") as disclosed herein for color-coded marking of an optical fiber.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Likewise, relative terms like top, bottom, side, horizontal, vertical, etc. are used for convenience and ease of explanation and are not intended to be limiting as to direction or orientation. In some cases, the term "vertical" means aligned with the direction of gravity and the term "horizontal" means in a plane perpendicular to vertical.

Any ranges on numerical values set forth herein include the end values, e.g., for the phrases "in the range from A to B" or "in the range between A and B," and like phrases, the range includes the values A and B unless otherwise stated.

The terms "downstream" and "upstream" are used herein to indicate positions relative to the direction of the movement of the optical fiber over a fiber path through the high-speed optical fiber marking apparatus as described below. Thus, an apparatus component B that is downstream (upstream) of an apparatus component A processes a given section of the optical fiber after (before) it is processed by the apparatus component A.

The number density of color-coded marks is denoted as N and is the number of color-coded marks per unit length, and is given as the number of color-coded marks per meter (m) unless stated otherwise.

The abbreviation "μm" is used to denote "micron" or "micrometer," with the abbreviation "nm" is used to denote "nanometer."

The abbreviation "mm" is used to denote "millimeter."

The "fiber speed" is denoted by SF and is the speed at which the optical fiber moves over the fiber path through the high-speed optical fiber marking apparatus, and is also referred to as the "line speed."

The term "ink" used herein as shorthand for any liquid material that can be formed into a stream and that can be used to form a mark on the outer surface of an optical fiber.

The term "mark" as used herein is used to denote any type of simple indicia formed on an outer surface of the optical fiber over an axial mark length LM using the ink. The term "color-coded mark" means a set or grouping of two or more relatively closely spaced individual marks, wherein at least two of the individual marks have a different color. Different shades of gray are considered herein as different colors.

The term "ink stream" means a flow of ink (as defined above), wherein the flow is continuous for at least an amount of time sufficient for the optical fiber being marked to be deflected from its normal or nominal path into the flow to at least partially enter the flow, and then to leave the flow to return to its normal or nominal path. In an example, the ink stream is already established and flowing past the optical fiber when the optical fiber is moving toward the ink stream and continues flowing until after the optical fiber has exited the ink stream. In one example, the ink stream flow is continuous for at least the time for two incursions of the optical fiber into the ink stream to form at least two marks. In another example, the flow of the ink stream is continuous for forming more than two marks, such as for forming ten marks or fifty marks or one hundred marks or many hundreds of marks, etc. The ink stream as considered herein differs from an ink jet in that an ink jet consists of individual droplets that are charged and then deflected by charged deflection plates. In contrast, the ink stream has a flow volume such that the stream is not discernable as individual droplets of ink and is not readily amenable to charge-based deflection. Said differently, an ink jet provides a plurality of discrete ink droplets with discernible and regular gaps therebetween, and the ink stream described herein constitutes a continuous flow of ink uninterrupted by gaps that are substantially smaller than the length of the ink stream. A typical ink droplet is no larger than about 100 microns in diameter (e.g., typically 50 microns to 70 microns), whereas the length of a given ink stream considered herein is substantially larger than that of a single ink droplet, i.e., the length of the ink stream (as measured between successive gaps in the ink stream) is substantially larger than the size (diameter) of one ink droplet, such as at least twice the size of typical ink droplet or at least four times the size of typical ink droplet or at least ten times the size of typical ink droplet or at least fifty times the size of typical ink droplet or at least one hundred times the size of typical ink droplet or at least one thousand times the size of a typical ink droplet.

The term "briefly" as used in connection with the optical fiber intersecting (or otherwise residing in, being immersed in, etc.) the ink streams refers to an amount of time (called the "immersion time" and denoted $t_D$) for forming individual marks from the ink streams on the fiber that have a desired axial length (denoted LM) which is typically on the order of 1 mm to 10 mm, though larger marks can be formed. The immersion time depends in part on the line speed SF, the diameters of the ink streams, and the desired axial length of the mark. An amount of time that would not be considered "brief" is one where a very large axial length of fiber (e.g., a meter) is coated with ink by immersion in the ink streams, or where a mark from one ink stream would be inadvertently covered by a mark from another ink stream.

Optical Fiber Marking Apparatus

FIG. 1A is a schematic diagram of an optical fiber marking apparatus ("apparatus") 10 for marking an optical fiber ("fiber") 50. The apparatus 10 has a first or starting end 12 and a second or finishing end 14. The fiber 50 is subjected to various processes (described below) and is in various states as it passes through the apparatus 10. Portions of the fiber 50 can differ in state or configuration along its length as it is being processed, such as unmarked, marked, marked but not covered (with a protective overcoat), and marked and covered (overcoated). It will be apparent to one skilled in the art based on the context of the discussion, the various Figures and the particular portion of the fiber 50 being discussed as to which state or configuration of the fiber is being considered.

Figure 1B:
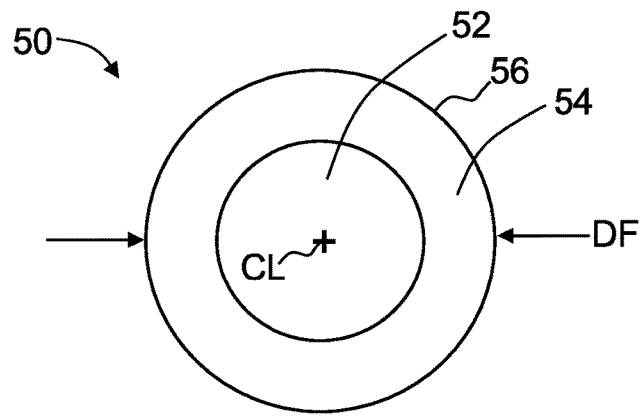
FIG. 1B is a close-up cross-sectional view of an example unmarked optical fiber.

The section of the fiber 50 upstream of marking location ML (see also FIG. 1C) is unmarked. The (unmarked) fiber 50 is shown in cross-sectional view in FIG. 1B. The fiber 50 comprises a glass fiber 52 that includes a glass core and a glass cladding (not shown separately), and a coating 54 that includes one or more layers designed to prevent damage to the glass fiber 52 when the fiber 50 is handled or subjected to stress. The coating 54 is common to most optical fibers and is typically a polymer (e.g. acrylate or urethane). In a typical configuration, the coating 54 includes a low-modulus primary layer adjacent the glass fiber 52 and a high-modulus secondary layer adjacent the primary layer. The fiber 50 has an outer surface 56, which in FIG. 1B is defined by the coating 54 but can also be defined by a protective overcoat as explained below. The fiber 50 has a centerline CL that defines an axial direction down the fiber. The fiber 50 has a diameter DF.

With reference again to FIG. 1A, the apparatus 10 includes at the first end 12 a payout module 20. The payout module includes a storage reel 30 that stores a length of unmarked fiber 50. The apparatus 10 also includes at the second end 14 a take-up module 220. The take-up module 220 includes a storage reel 230 that stores the fiber 50 after it has been marked and optionally covered with a protective overcoat by the apparatus 10, as explained below. The payout module 20 and the take-up module 220 each include a drive pulley 36D used to drive the fiber 50 over a fiber path FP through the apparatus 10 from the payout module 20 to the take-up module 220. In an example, the fiber path FP is defined at least in part by one or more guide pulleys 36G, such as the multiple guide pulleys as arranged and shown in FIG. 1A. Other arrangements of the guide pulleys 36G can also be effectively employed in the apparatus 10. The fiber 50 has a fiber speed SF over the fiber path FP as defined by the drive pulleys 36D. In the example configuration of FIG. 1A, the most upstream drive pulley 36D and the first downstream guide pulley 36G define a fiber span FS that is under tension.

The apparatus 10 further includes at least one marking unit 100 that resides downstream of the payout module 20 and upstream of the take-up module 220. The marking unit shows three ink stream dispenser units 110 by way of example. The marking unit 100 is positioned adjacent the fiber path FP, as explained in greater detail below. The marking unit 100 has an (upstream) input end 102 that receives unmarked fiber 50 and a (downstream) output end 104 that delivers marked fiber to downstream units of apparatus 10.

In the example apparatus 10 of FIG. 1A, a fiber positioning device 250 is operably located at or adjacent the marking unit 100. The fiber positioning device 250 defines the portion of the fiber path FP in the vicinity of the marking unit 100 and in one example is used to adjust the position of the fiber 50 and the fiber path FP, as explained below.

Figure 1C:
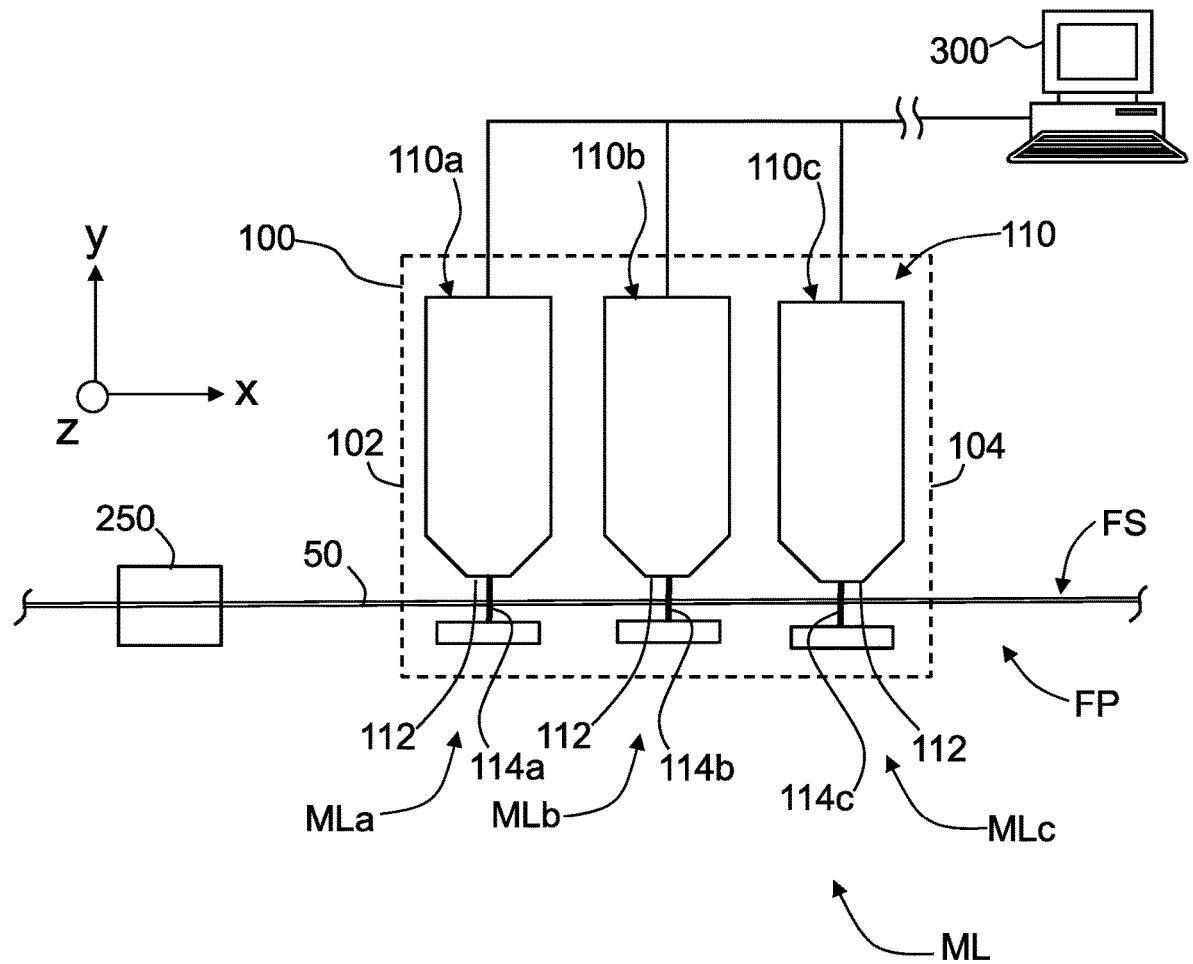
FIG. 1C is a close-up view of a marking unit of the apparatus of FIG. 1A showing by way of example three ink stream dispenser units, along with an upstream fiber positioning device.

FIG. 1C is a close-up view of an example marking unit 100 of the apparatus 10 of FIG. 1A. The example marking unit 100 shows by way of example the three ink stream dispenser units 110, denoted in FIG. 1C as 110a, 110b and 110c, which respectively generate ink streams 114a, 114b and 114c. The ink streams 114 formed by the marking unit 100 are generally denoted 114a, 114b, . . . since in general two or more ink streams are formed by two or more ink stream dispenser units 110a, 110b, . . . . The ink streams 114a, 114b reside in close proximity to each other (e.g., from a few millimeters up to about 1 cm) and are arranged substantially in a row, i.e., substantially in line with each other. In one example, each of the two or more ink streams 114a, 114b, . . . has a different color from the other ink streams. More generally, at least two of the two or more ink streams 114a, 114b, . . . have different colors, so that in certain examples some of the ink streams can have the same color.

FIG. 1C also shows an example fiber positioning device 250 is disposed upstream of the marking unit. Example fiber positioning devices 250 are discussed below.

Figure 1D:
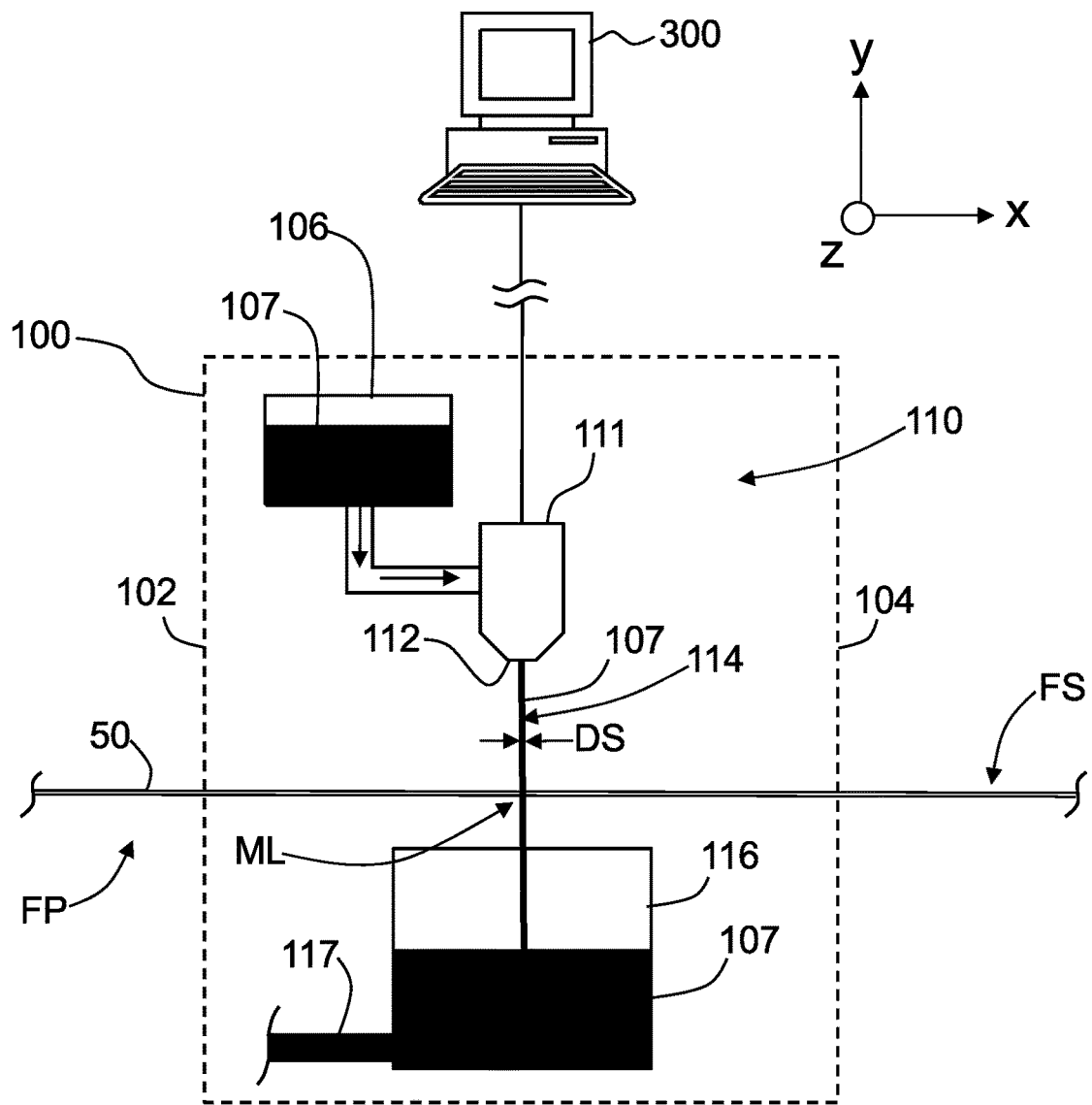
FIG. 1D is a schematic diagram of an example of one of the ink stream dispenser units of FIG. 1C.

FIG. 1D is a close-up view of an example ink stream dispenser unit 110 used in the marking unit 100 of FIG. 1C. An example ink stream dispenser unit and fiber position devices, as well as fiber marking methods using an ink stream, are disclosed in U.S. Patent Application Ser. No. 62/790,135, filed on Jan. 9, 2019, and entitled "Apparatus and methods for marking optical fibers using an ink stream," and which is incorporated by reference herein.

The ink stream dispenser unit 110 includes an ink supply 106 that supplies ink 107 to an ink stream nozzle ("nozzle") 111 having an output end 112. The ink stream nozzle 111 outputs the ink 107 at the output end 112 in form of an ink stream 114 that defines a marking location ML. Thus, with reference again to FIG. 1C, the three ink streams 114a, 114b and 114c define three different marking locations MLa, MLb and MLc within a general or overall marking location ML. At least two of the ink streams 114a, 114b and 114c have different colors, and in an example, none of the ink streams have the same color.

Figure 1E:
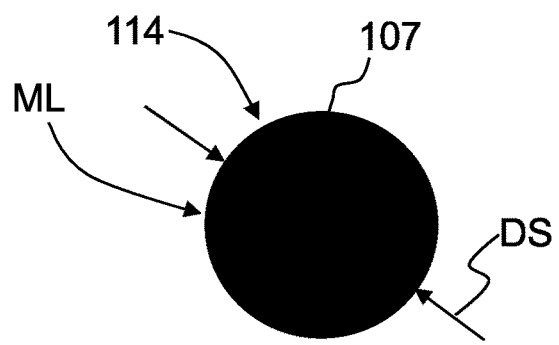
FIG. 1E is a close-up cross-sectional view of an example ink stream formed by the ink stream dispenser unit of FIG. 1D.

In an example, the output end 112 of the nozzle 111 can include or be configured to define a diameter DS of the ink stream (see also FIG. 1E). In an example, the nozzle 111 can be configured to start and stop the flow of the ink stream, e.g., can be electrically controlled under the direction the controller 300 (introduced and discussed below). In FIG. 1D, the ink stream 114 is shown as running (flowing) in the −y direction while the fiber 50 runs in the +x direction. More generally, the relative direction of the ink stream 114 and the fiber path FP can be any reasonable direction other than parallel, with a preferred relative direction for some applications being substantially perpendicular, e.g., with the ink stream running in the vertical direction (i.e., along the direction of gravity) and the fiber path FP residing substantially in a horizontal plane to the vertical direction.

With continuing reference to FIG. 1D, the ink 107 from the ink stream 114 that is not used for forming marks 60 on the fiber 50 (the marking process is explained below) is collected by a container 116. A conduit (pipe) 117 that leads from the container 116 can be used to carry away the collected ink 107 so that it can be recycled (e.g., back to the ink supply 106) or disposed of. As noted above, and as shown in the close-up view of FIG. 1E, the ink stream 114 has a diameter DS. In general, the ink stream diameter DS can be any reasonable value for forming marks 60. An advantage of using an ink stream 114 over a conventional ink jet from an ink jet printer head that emits bursts of ink droplets is that the ink stream can have essentially an arbitrary size. In one example, the ink stream diameter DS can be in the range 20 µm≤DS≤5000 µm, or 50 µm≤DS≤5000 µm, or 100 µm≤DS≤5000 µm, or 250 µm≤DS≤5000 µm. In other examples, the ink stream diameter can be at least as large as half of the fiber diameter DF, and in other examples the ink stream diameter DS satisfies (0.5)·DF DS≤10·DF or DF≤DS≤5·DF or DF≤DS≤3·DF. The portion of the fiber 50 downstream of the marking location ML is marked fiber.

Note that the different ink stream dispenser units 110a, 110b, . . . can generate ink streams with different diameters DS, which can be used to form individual marks 60a, 60b, . . . having different axial lengths.

With reference again to FIG. 1A, an optional position sensor 120 can be disposed immediately downstream of the marking unit 100 and operably arranged relative to the fiber path FP to measure a displacement of the fiber 50 relative to a reference position, such as a nominal or ideal fiber path. A dryer unit 130 resides downstream of the position sensor 120 and includes an input end 132 for receiving the marked fiber 50 and an output end 134 for delivering the marked fiber in a state in which the different inks 107 used to make the color-coded marks 60C has dried. The dryer unit 130 defines a drying location DL along the fiber path FP. In an example, the dryer unit 130 comprises a dryer tube 136 with an interior 138 through which the fiber path FP passes. In the example shown in FIG. 1A, a second dryer unit 130 is arranged along the fiber path FP to ensure mark drying in the case of high fiber speeds.

In an example, a mark counter 150 resides immediately downstream of the dryer unit 130 and is operably arranged relative to the fiber path FP to count the number of individual marks 60 as well as the number of color-coded marks 60C to ensure that the proper number of such marks per unit length (i.e., the mark number density N) is being generated by the apparatus 10. An overcoat applicator 170 resides downstream of the marking counter 150 and includes an input end 172 that receives the marked fiber 50 and an output end 174 that delivers a covered (overcoated) fiber. The fiber path FP passes through the overcoat applicator 170. In an example, the overcoat applicator 170 includes a coating tube 178 with an interior 179 through which the fiber path FP passes.

A curing system 190 resides immediately downstream of the overcoat applicator 170 and has an input end 192 for receiving the now marked and covered (overcoated) fiber 50 with an uncured overcoat, an output end 194 for delivering marked and covered fiber with a cured overcoat 180, and an interior 195, with the fiber path FP passing through interior. The combination of the overcoat applicator 170 and the curing system 190 defines an overcoating system 199.

The aforementioned take-up module 220 resides immediately downstream of the curing system 190 at the second (finishing) end 14 of the apparatus 10 and takes up the marked and overcoated fiber 50 onto the storage reel 230.

In an example, a marking unit 100 can be disposed within or downstream of the overcoating system 199 to form color-coded marks 60C on the protective overcoat 180 rather than or in addition to marks residing beneath the protective overcoat. This approach can be useful where the protective overcoat is colored and where the marks 60 can be more visible on the outer surface of the protective overcoat 180 rather than underneath the protective overcoat.

The apparatus 10 also includes a controller 300 that is operably connected one or more of the payout module 20, the take-up module 220, the marking unit 100, the fiber positioning device 250, the position sensor 120, the dryer unit 130, the mark counter 150, and the overcoating system 199. The controller 300 is configured to control these apparatus components and the overall operation of the apparatus 10, including the fiber speed (line speed) SF of the fiber 50 through the apparatus 10 over the fiber path FP. In an example, the controller 300 controls the marking unit 100 to start and stop the multiple ink streams 114a, 114b, . . . . In some examples where the ink streams 114a, 114b, . . . are intermittent, the ink stream flow is timed to correspond to when the fiber 50 is deflected out of its nominal fiber path FP as described below, or when the ink streams are deflected, also as described below. In some examples, the controller 300 starts the flow of the ink streams 114a, 114b, . . . at the start of the marking process and then terminates the flow of the ink streams when the fiber marking process is completed.

In an example, the controller 300 comprises a programmable logic controller (PLC) configured to carry out instructions (software, firmware, etc.) embodied in a non-transitory computer-readable medium and that cause the apparatus 10 to carry out the methods disclosed herein. In some examples, the controller 300 need not be connected to and control some of the apparatus components that could be operated independently.

While the fiber speed SF can be relatively slow (e.g., 0.5 m/s), the apparatus and methods disclosed herein are particularly useful for fiber speeds in excess of about 2 m/s or 5 m/s or 10 m/s. In an example, apparatus and methods disclosed herein can operate at fiber speeds SF of greater than 2 m/s, or greater than 5 m/s or greater than 10 m/s or greater than 20 m/s, or greater than 30 m/s, or greater than 40 m/s or greater than 50 m/s. In an example, the fiber speed SF is limited only by the operating limits of the fiber positioning device 250.

Color-Coded Marking Using a Fiber Positioning Device

Figure 2A:
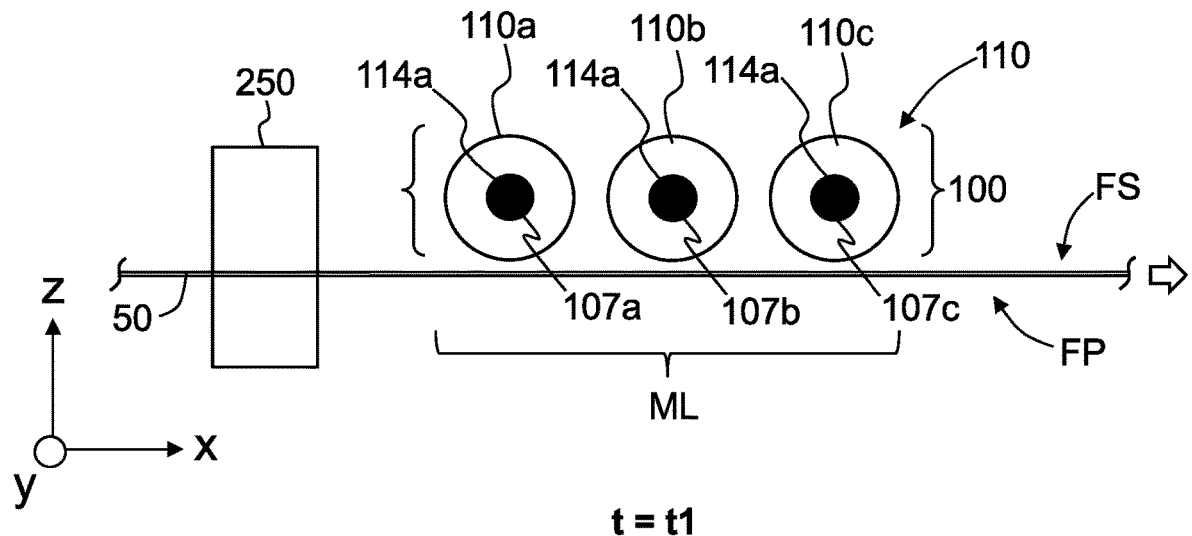
FIGS. 2A through 2C are top-down schematic diagrams of the fiber positioning device and the three example ink stream dispenser units therein at three different times t=t1, t2 and t3, respectively, illustrating the fiber positioning device moving the fiber path from its initial (non-marking) position (FIG. 2A) to a marking position (FIG. 2B) so that the optical fiber intersects the ink streams, and then moving the fiber path back to its initial (non-marking) position (FIG. 2C).
Figure 2B:
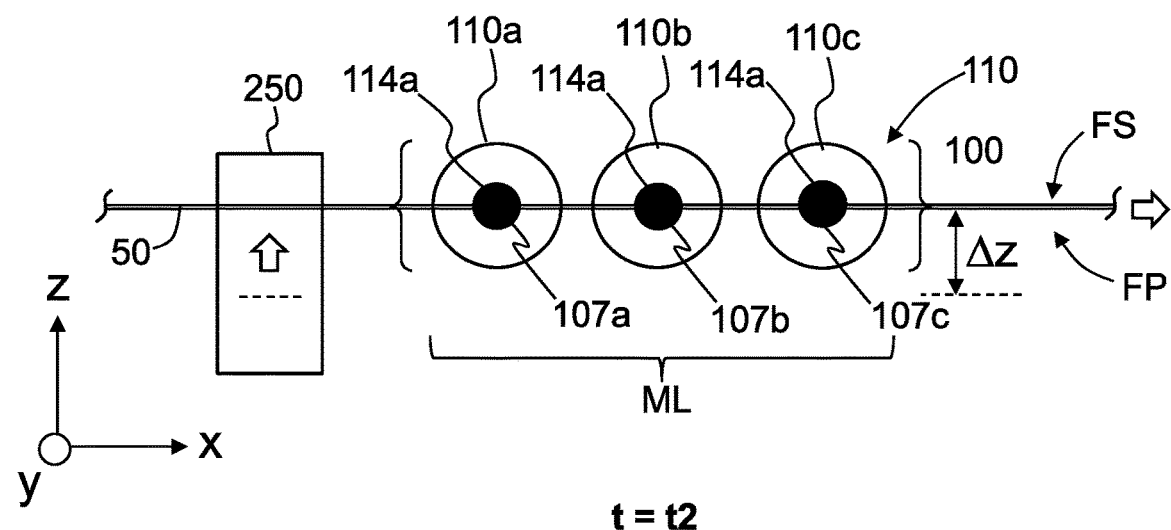
Figure 2C:
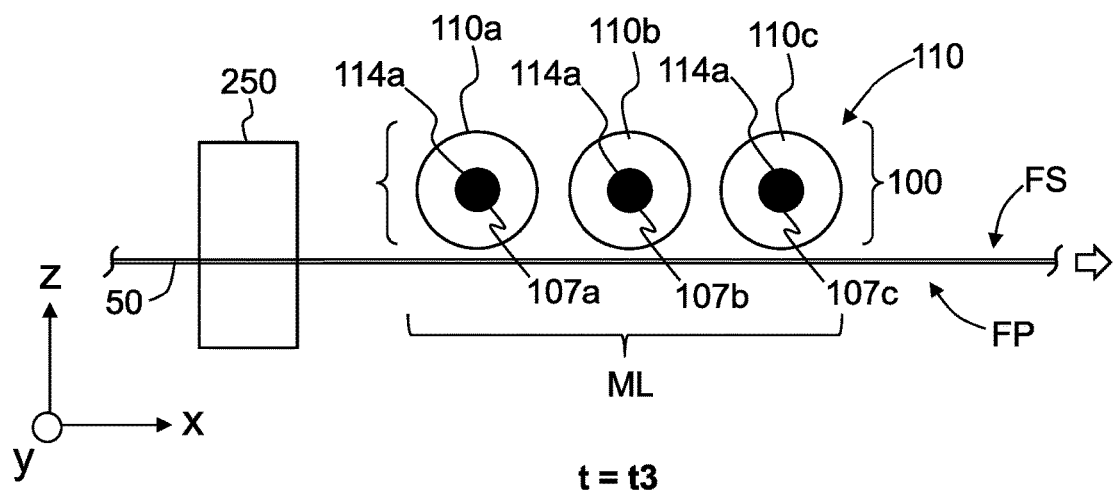

FIGS. 2A through 2C are top-down schematic diagrams of the fiber positioning device 250 and the three example ink stream dispenser units 110a, 110b and 110c of the example marking unit 100 at three different times t=t1, t2 and t3, respectively. FIG. 2A shows the fiber 50 traveling along an initial fiber path FP where no marking of the fiber takes place. The fiber path FP resides close to the ink streams 114a, 114b and 114c, which are relatively closely spaced to one another.

FIG. 2B shows the fiber position device 250 having moved the fiber path FP in the +z direction by an amount Δz so that the fiber 50 intersects (i.e., passes through a portion of) the three ink streams 114a, 114b and 114c. The adjusted fiber path FP can be said to be at a marking position, as compared to the initial fiber path FP being a non-marking position.

FIG. 2C is similar to FIG. 2A and shows the fiber path FP moved from the marking positon to the non-marking (initial) position. The movement of the fiber path FP to the marking position is sufficiently brief so that three individual marks 60, denoted 60a, 60b and 60c, are formed by the respective ink streams 114a, 114b and 114c, as shown in the close-up view of the marked fiber 50 of FIG. 2D. The individual marks 60a, 60b and 60c constitute a set of marks 60C, also referred to herein as a "color-coded mark," wherein at least two of the two or more marks 60a, 60b, . . . (e.g., first and second ones of the multiple marks) have a first and second colors that are different. The spacing between the groups of marks is denoted SC, and is typically substantially larger (e.g., at least 3× greater) than the spacing between adjacent individual marks 60. In an example, the spacing SC between the color-coded marks is in the range from 50 mm to 250 mm. The spacing SC used can depend on the particular application of the fibers 50 (e.g., terrestrial fiber applications versus submarine fiber applications).

Figure 2D:
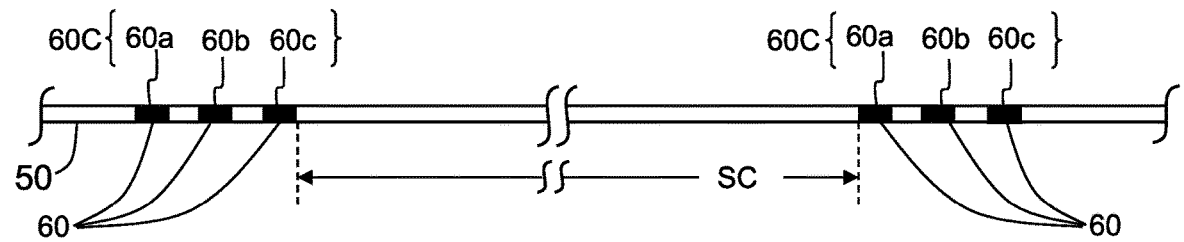
FIG. 2D shows example sections of the optical fiber having spaced apart color-coded marks (having an axial spacing SC as shown) as formed by the example marking method shown in FIGS. 2A through 2C.
Figure 2E:
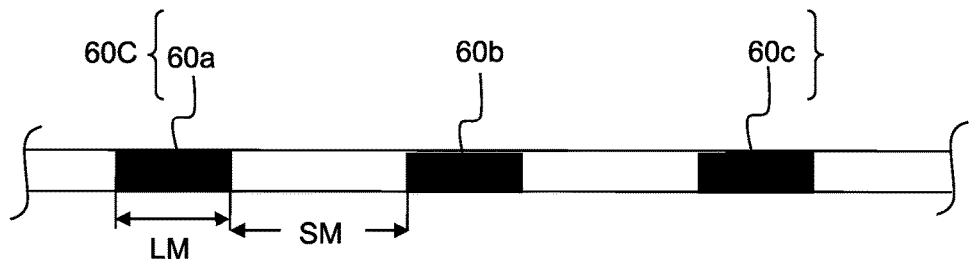
FIG. 2E is a close-up view of an example color-coded mark showing the individual mark lengths (LM) and the mark spacing (SM) between adjacent marks within the color-coded mark.

FIG. 2E is a close-up view of an example color-coded mark 60C showing an individual mark length LM and a mark spacing SM between adjacent individual marks 60 (i.e., marks 60a, 60b and 60c). In an example of a relatively compact color-coded mark, the individual marks 60 can have a length LM in the range from 1 mm to 10 mm or from 1 mm to 5 mm, while the spacing SM can be in the range from 1 mm to 20 mm or from 1 mm to 10 mm. Other lengths LM and spacings SM can also be used, depending on the particular marking requirements. In principle, a spacing SM=0 can be used, but such a spacing may not be preferred since it may make it difficult to discern the different individual marks. The axial lengths LM of the individual marks $60a$, $60b$, ... are determined in part by the length of time the fiber 50 resides in the given ink stream $114a$, $114b$, ... and the fiber (line) speed SF.

The fiber 50 resides in the ink streams $114a$, $114b$, ... for a relatively brief period of time (referred to herein as the "immersion time" $t_D$) so that the axial color-coded mark 60C can be made relatively compact. For example, for a line speed of 10 m/s, and a desired axial length LM of 1 cm (10 mm or 0.01 m) for a given individual mark 60, the immersion time $t_D$ of the fiber in the given ink stream is 0.001 seconds. For color-coded marks 60C with a marking density of 5 (i.e., 5 color-coded marks per meter) and for a line speed of 10 m/s, the marking process occurs at a "marking time" $t_M$ of every 0.02 seconds. So in this particular example, the immersion time $t_D$ is 20× smaller than the marking time $t_M$.

Example Fiber Positioning Devices

Figure 3A:
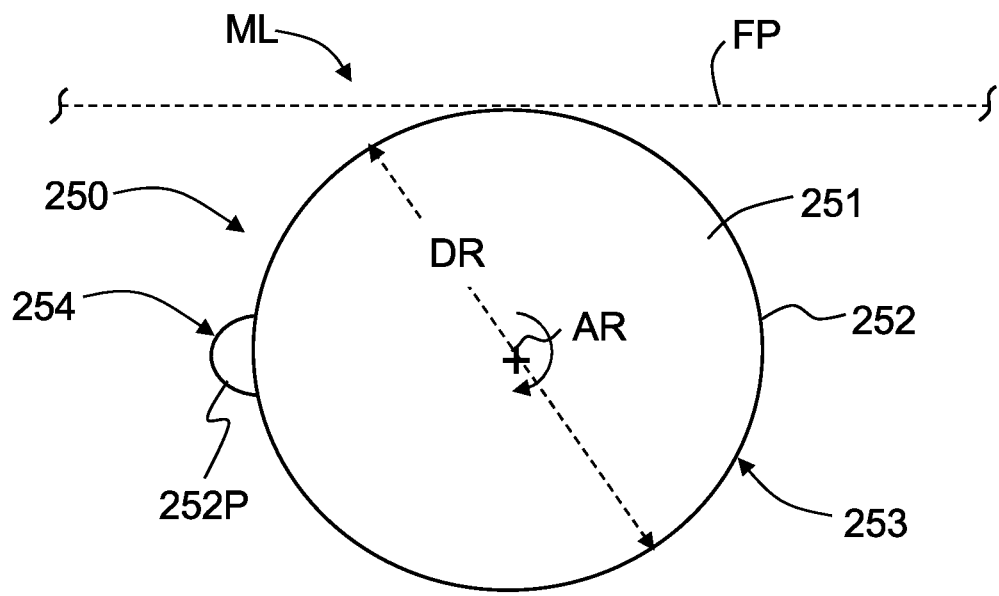
FIG. 3A is a close-up top-down view of an example fiber positioning device in the form of a generally round roller having a position adjustment feature in the form of a protrusion on the edge of the roller.

FIG. 3A is a close-up top-down view of an example fiber positioning device 250, as described in aforementioned U.S. Patent Application Ser. No. 62/790,135, entitled "Apparatus and methods for marking optical fibers using an ink stream."

Figure 3B:
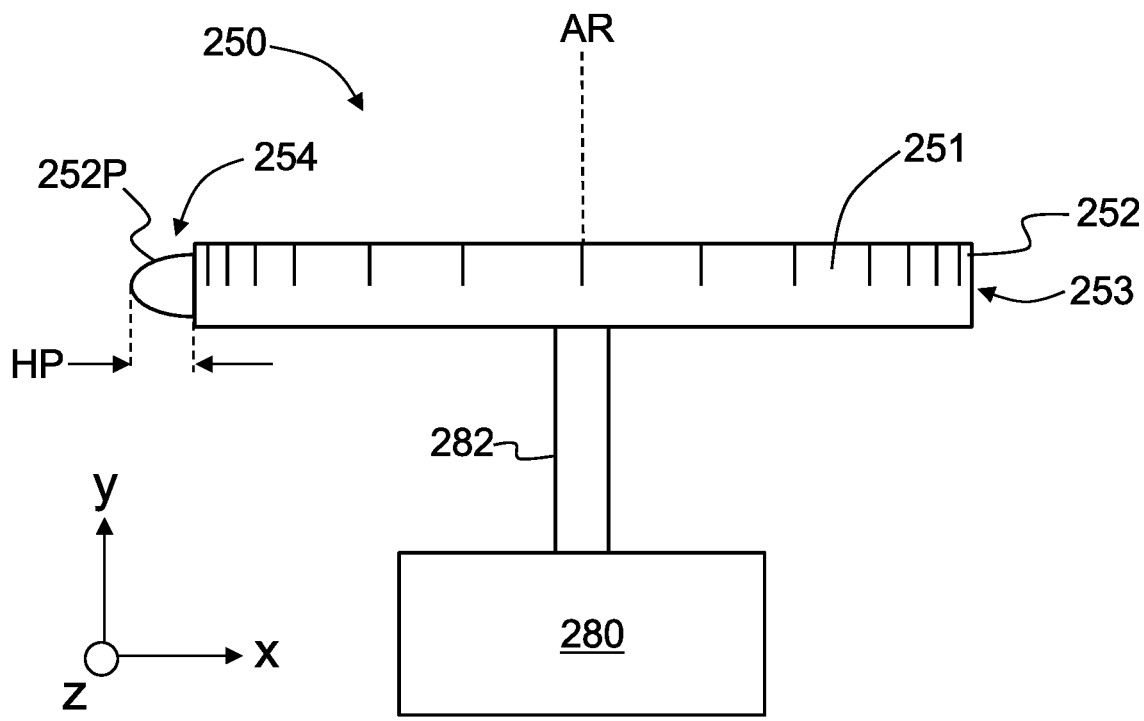
FIG. 3B is a side view of the example fiber positioning device of FIG. 3A showing how the roller is driven by a drive motor and a drive shaft.

FIG. 3B shows a side view of the example fiber positioning device. The fiber positioning device 250 is arranged adjacent the fiber path FP proximate to the marking location ML in the apparatus 10. The example fiber positioning device 250 includes a roller 251. The roller 251 has an axis of rotation AR. An example roller 251 has the general configuration of a round pulley (i.e., is disc shaped). The roller 251 has a perimeter 252 with a perimeter (outer) surface 253. The perimeter 252 includes at least one position adjustment feature 254. In the example of FIG. 3A, there is one position adjustment feature 254 in the form of a protrusion 252P located on the outer surface. The protrusion 252P has a height HP as measured from the nominal perimeter surface 253 of the perimeter 252, as shown in FIG. 3B. The protrusion 252P can have a cross-sectional shape that is substantially semi-circular or a section of a semicircle or a section of an ellipse, or any other reasonable shape capable of positioning the fiber 50 to accomplish the fiber marking process disclosed herein. The surface of the protrusion 252P constitutes part of the perimeter surface 253 and the perimeter 252 of the roller 251.

In an example, the protrusion 252P is a fixed part of the roller 251. In another example, the protrusion 252P is an adjustable part of the roller 251. For example, the roller 251 can be configured so that different protrusions 252P can be added to or removed from the roller at one or more locations at the perimeter 252. In another example, the protrusion 252P is adjustable within the roller 251 to change the size and/or shape of the protrusion.

In an example, the perimeter surface 253 can include a shallow groove (not shown) to accommodate a portion of the outer surface 56 of the fiber 50 to help guide the fiber. The rotation direction of the roller 251 is shown as clockwise about the axis of rotation AR.

FIG. 3B also illustrates an example where the roller 251 is operably connected to and rotationally driven by a drive motor 280. In an example, the drive motor 280 is mechanically connected to the roller 251 via a drive shaft 282. In an example, the drive motor 280 is operably connected to the controller 300 so that the rotation speed of the roller corresponds to (i.e., substantially matches) the fiber speed SF.

Figure 3C:
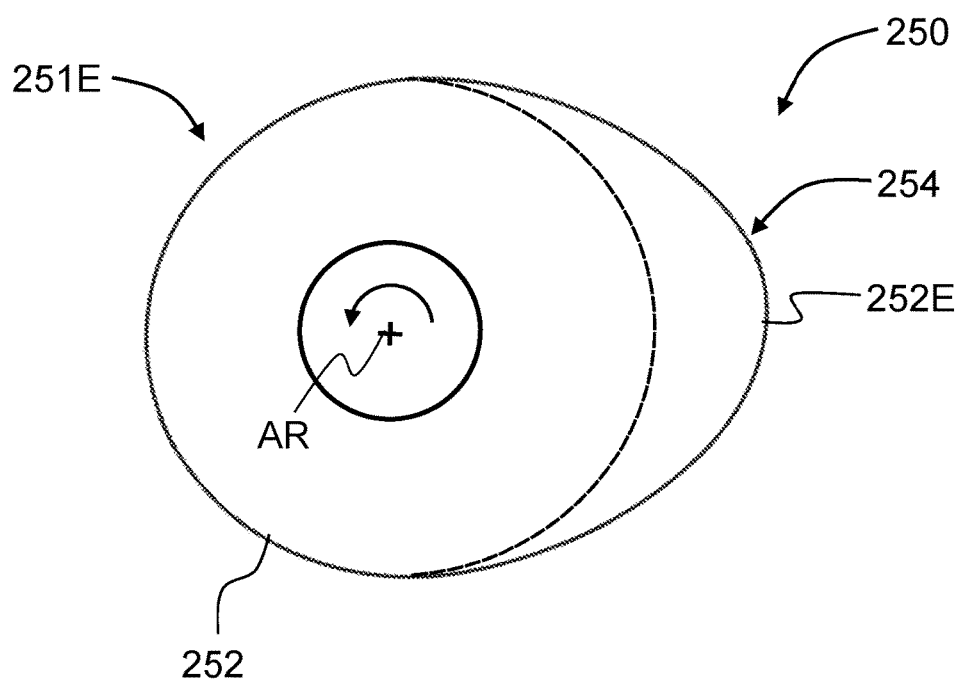
FIG. 3C is similar to FIG. 3A and shows an example of an eccentric roller having an eccentric portion that serves as the position adjustment feature.
Figure 3D:
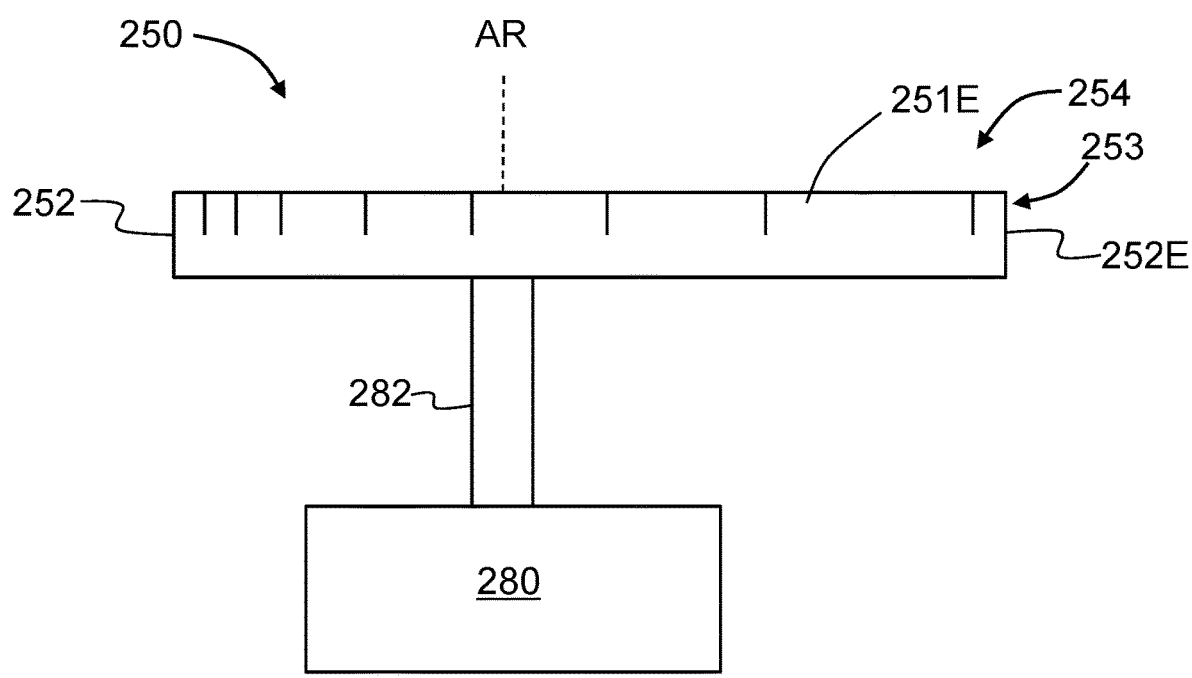
FIG. 3D is similar to FIG. 3C and shows the eccentric roller driven by the drive motor and the drive shaft of FIG. 3B.

FIG. 3C is similar to FIG. 3A and shows an example fiber positioning device 250 that includes an eccentric roller 251E having an eccentric portion 252E that serves as the position adjustment feature 254. FIG. 3D is similar to FIG. 3C and shows the eccentric roller driven by the drive motor and the drive shaft of FIG. 3B. The operation of the fiber positioning device 250 of FIGS. 3C and 3D is analogous to that shown in FIGS. 3A and 3B and as discussed below.

Figure 4A:
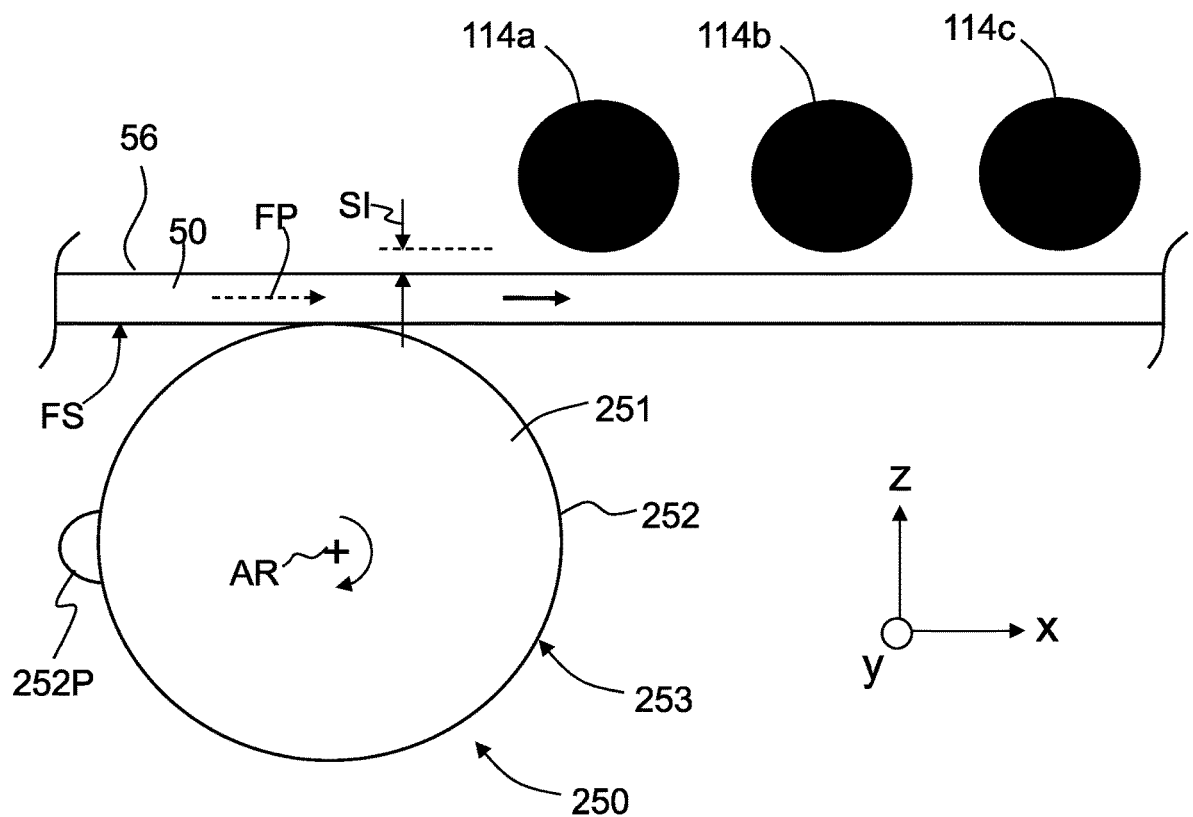
FIGS. 4A through 4C are top-down close-up views of the optical fiber moving through the marking location and illustrating how the roller with the protrusion changes the position of the fiber path so that the optical fiber intermittently intersects the ink streams to form a color-coded mark on the fiber, such as shown in FIG. 4C.
Figure 4B:
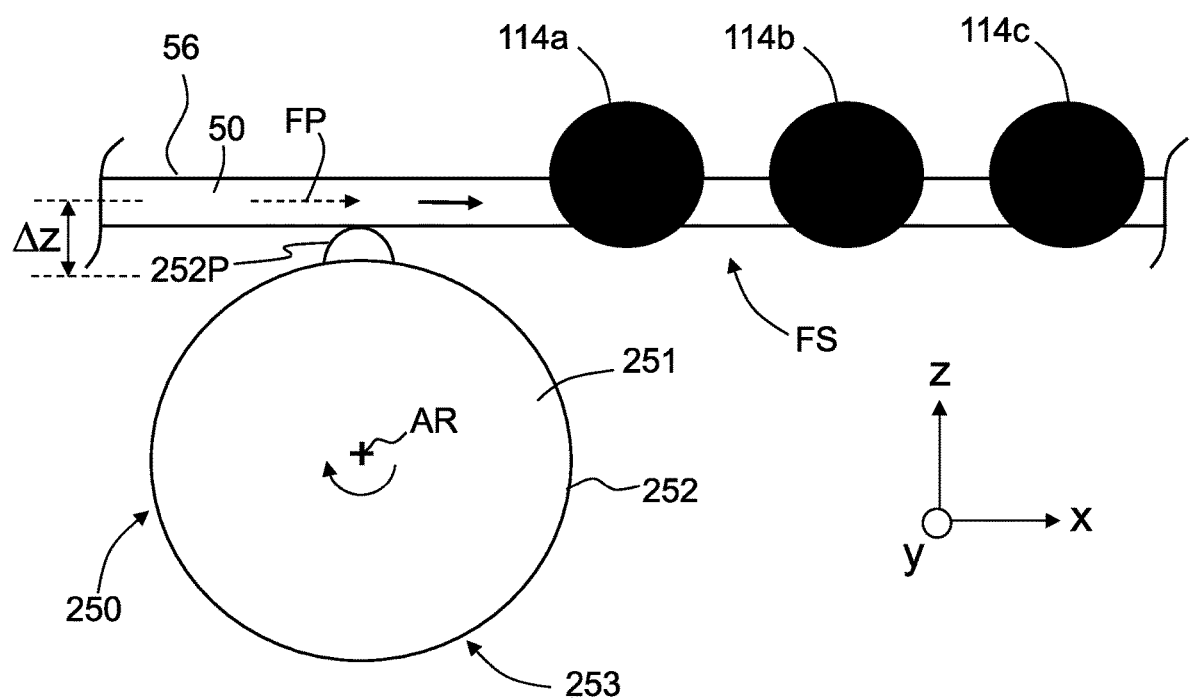
Figure 4C:
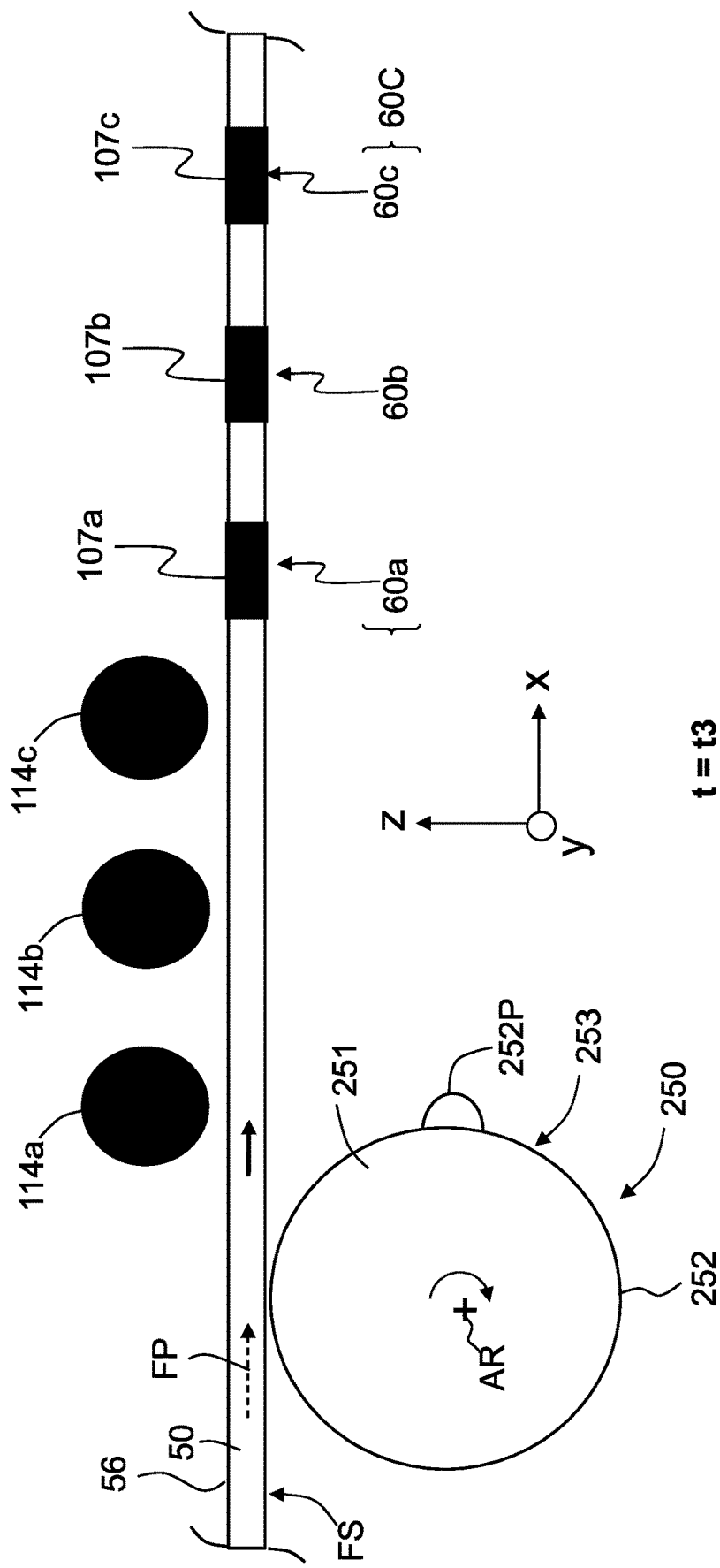

With reference now to FIGS. 4A through 4C, as the fiber 50 moves over the fiber path FP at a time t=t1 (FIG. 4A), the outer surface 56 of the fiber is in contact with the perimeter surface 253 of the fiber positioning device 250. The outer surface 56 of the fiber 50 also resides a distance SI from the ink stream 114. The roller 251 of the fiber positioning device 250 rotates clockwise about its rotation axis AR as the fiber 50 moves over the fiber path FP. FIG. 4A shows the protrusion 252P at the 9 o'clock position and thus away from and not contacting the fiber 50.

As the roller 251 rotates clockwise as shown, the protrusion 252P also moves clockwise and eventually approaches the 12 o'clock position at time t=t2 (FIG. 4B), at which point the leading edge of the protrusion contacts the fiber 50 and starts to move the fiber in the z-direction. As the roller 251 continues to rotate to the 12 o'clock position, the protrusion 252P pushes the fiber 50 farther in the z-direction by an amount Δz and into the ink stream 114, as shown in FIG. 4B. The continuing rotation of the roller 251 causes the fiber 50 to move down the trailing edge of the protrusion 252P, thereby allowing the fiber to move in the −z direction and exit the ink stream 114 and eventually return to its original fiber path FP, as shown in FIG. 4C at time t=t3. This process is repeated every time the protrusion 252P contacts the fiber 50. The different inks $107a$, $107b$ and $107c$ from the ink streams $114a$, $114b$ and $114c$ are deposited on the fiber outer surface 56 every time the fiber 50 resides within the ink stream forms sets 60C of spaced apart marks $60a$, $60b$ and $60c$ that form the color-coded mark 60C, as shown in FIG. 4C.

It will be understood that the various design parameters of apparatus 100, such as the number of marking units 100, the particular size, shape, number, spacings, etc. of the protrusions 252P and/or the eccentric portion 252E can be selected to form individual marks $60a$, $60b$, ... having a variety of sizes, shapes, spacings, groupings, patterns and colors.

Color-Coded Marking Using Ink Stream Deflection

In another embodiment, color-coded marks 60C are formed on the fiber 50 by deflecting two or more ink streams $114a$, $114b$, ... into the fiber path.

Figure 5A:
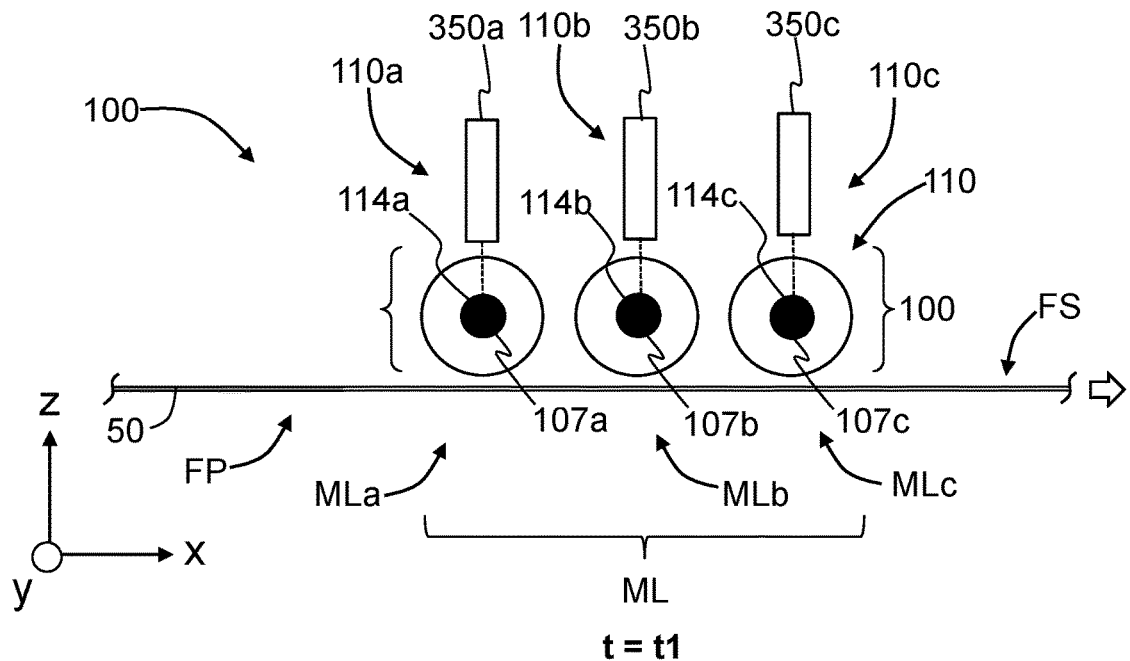
FIGS. 5A through 5C are top-down schematic diagrams of the three example ink stream dispenser units at three different times t=t1, t2 and t3, respectively, showing respective ink stream deflection devices moving (deflecting) the respective ink streams from an initial (non-marking) position (FIG. 5A) into the fiber path so that the ink streams intersect the optical fiber (FIG. 5B) to form color-coded marks (see FIG. 5C), and then moving the ink streams back to their original (non-deflected/non-marking) position (FIG. 5C).
Figure 5B:
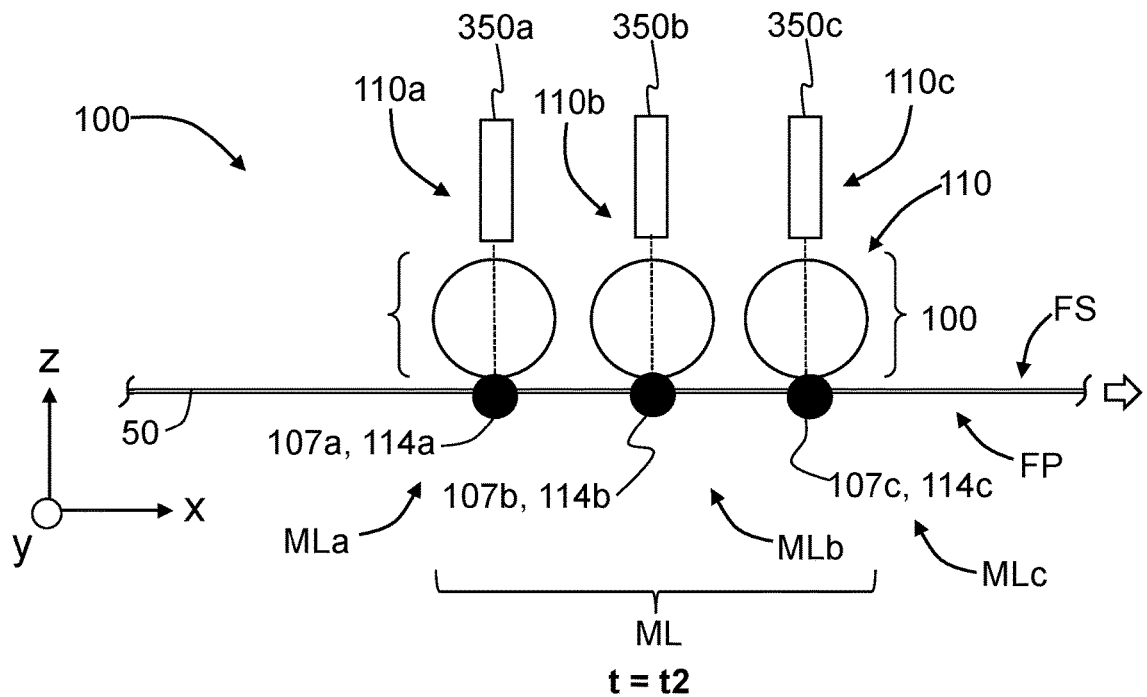
Figure 5C:
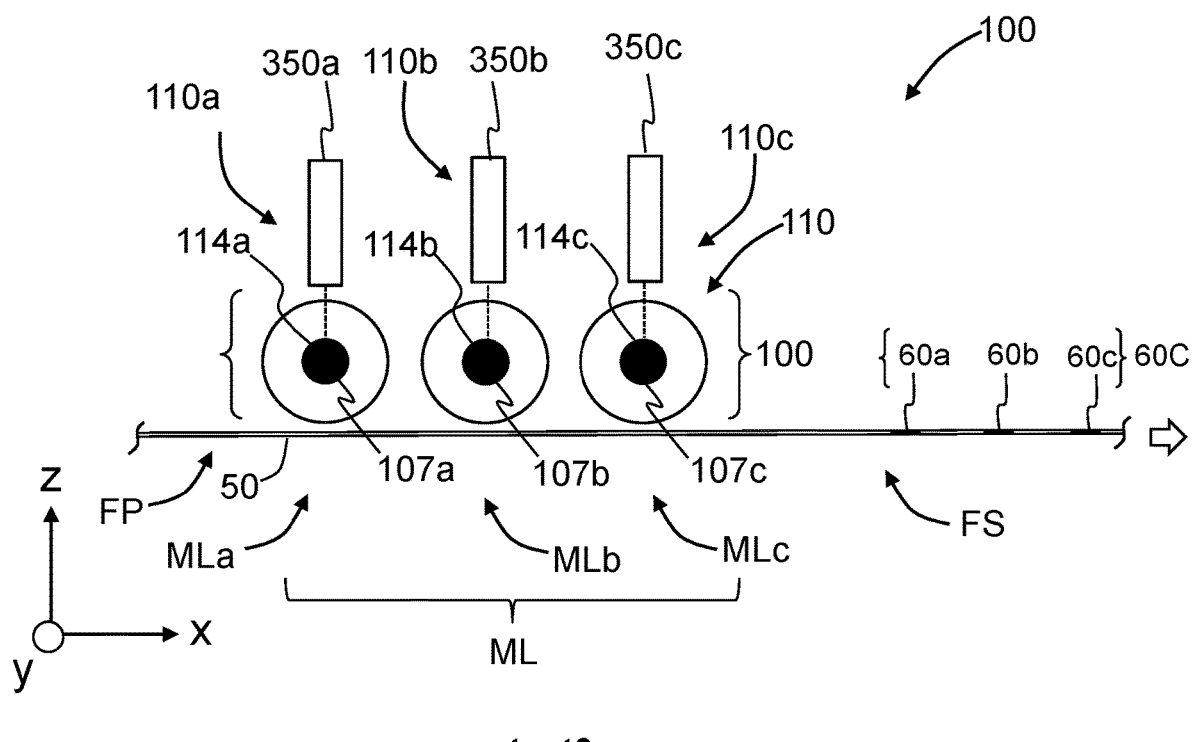

FIGS. 5A through 5C are top-down schematic diagrams of the three example ink stream dispenser units $110a$, $110b$ and $110c$ of an example marking unit 100 at three different times t=t1, t2 and t3, respectively. Respective ink stream deflection devices $350a$, $350b$ and $350c$ are used to move (deflect) the respective ink streams $114a$, $114b$ and $114c$ into the fiber path FP so that the ink streams intersect the fiber.

FIG. 5A shows the ink streams $114a$, $114b$ and $114c$ in their undeflected positions at time t=t1, with the fiber path FP running close by the ink streams. FIG. 5B shows the ink streams $114a$, $114b$ and $114c$ at time t=t2 in their deflected positions as caused by the activation of the ink stream deflection devices $350a$, $350b$ and $350c$. The ink stream deflections cause the ink streams $114a$, $114b$ and $114c$ to intersect the fiber path FP so that the fiber 50 passes through at least a portion of the ink streams at the respective marking locations MLa, MLb and MLc. FIG. 5C shows the ink streams $114a$, $114b$ and $114c$ returned to their undeflected positions by deactivating the ink stream deflection devices $350a$, $350b$ and $350c$. The individual marks 60, denoted $60a$, $60b$ and $60c$, formed on the (moving) fiber 50 that form the color-coded mark 60C are shown in FIG. 5C as well as in the close-up view of FIG. 2D discussed above. Since the controller 300 can control the operation of the ink stream deflection devices 350a, 350b and 350c, the formation of the color-coded marks 60C need not be periodic and thus can be formed at essentially arbitrary axial spacings SM' on the fiber 50.

Figure 6:
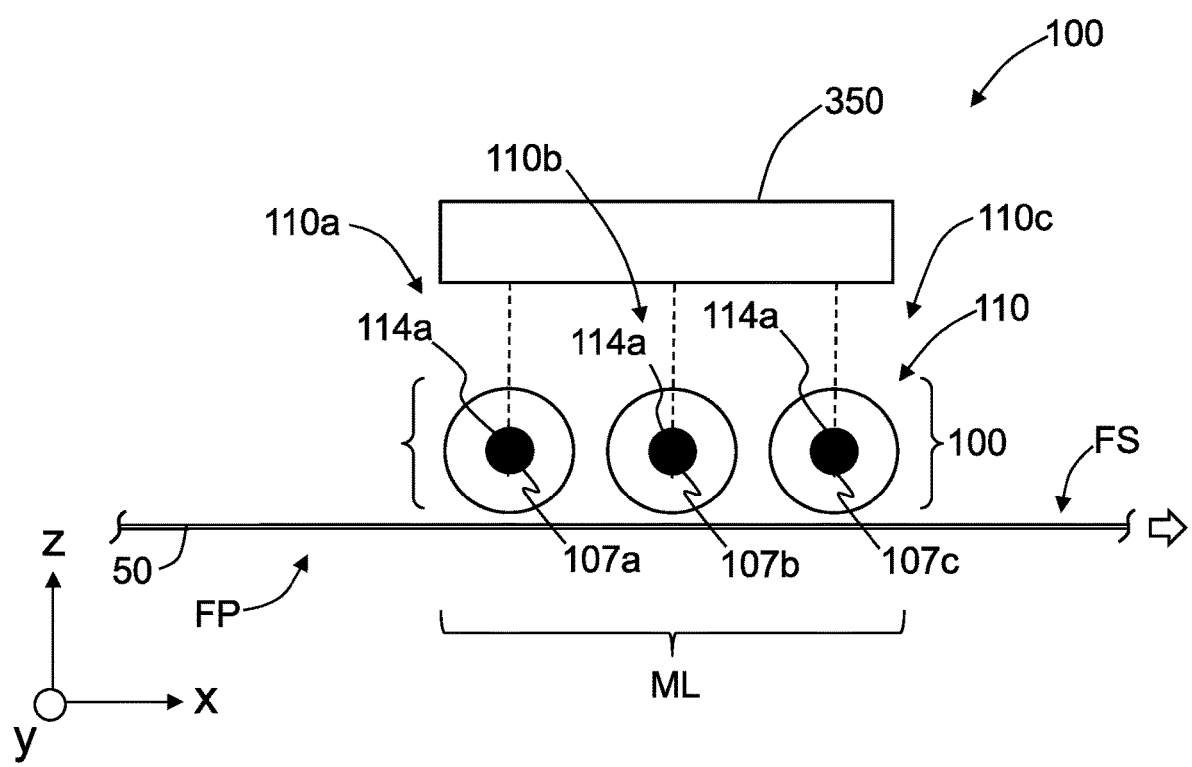
FIG. 6 is similar to FIG. 5A and illustrates an example where the three ink stream dispenser units utilize a single ink stream deflection device.

FIG. 6 is similar to FIG. 5A and illustrates an example where a single ink stream deflection device 350 is used rather than separate ink stream deflection devices.

Figure 7:
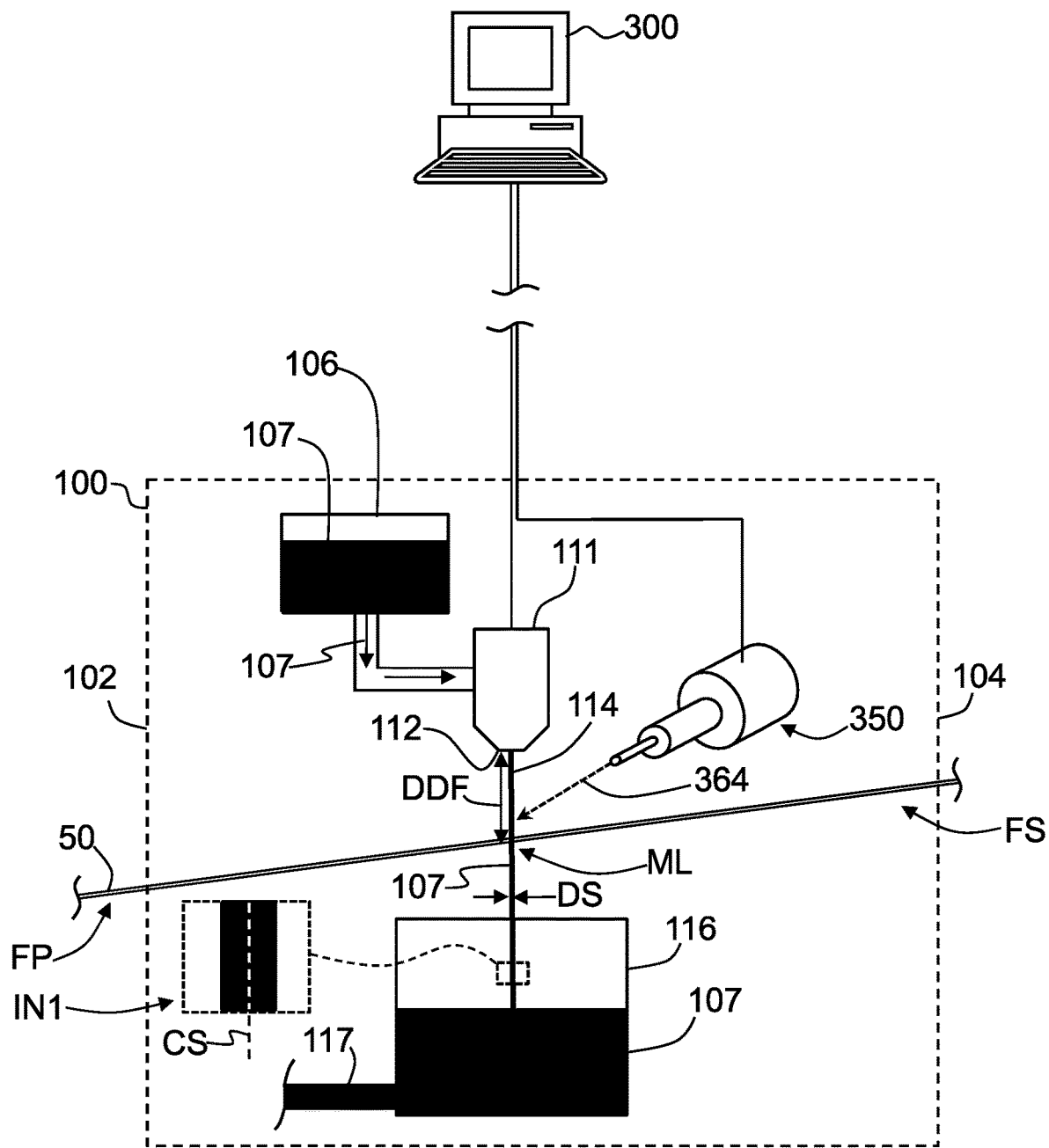
FIG. 7 is a schematic diagram of an example ink stream dispenser unit that includes an ink stream deflection device that deflects the ink stream using a gas jet.

FIG. 7 is a schematic diagram similar to FIG. 1D of an example ink stream dispenser unit 110 that also includes an ink stream deflection device 350 operably connected to the controller 300. The ink stream deflection device 350 is configured to generate a gas jet 364. The gas jet 364 is directed to the ink stream 114 and provides sufficient force to deflect the ink stream 114 into the fiber path. The gas jet 364 can be turned on and off using for example the controller 300. This can be accomplished by the activation and de-activation of a flow-control device (not shown). The ink stream 114 flows along a central axis CS (depicted in IN1).

Example Ink Stream Deflection Device

Figure 8A:
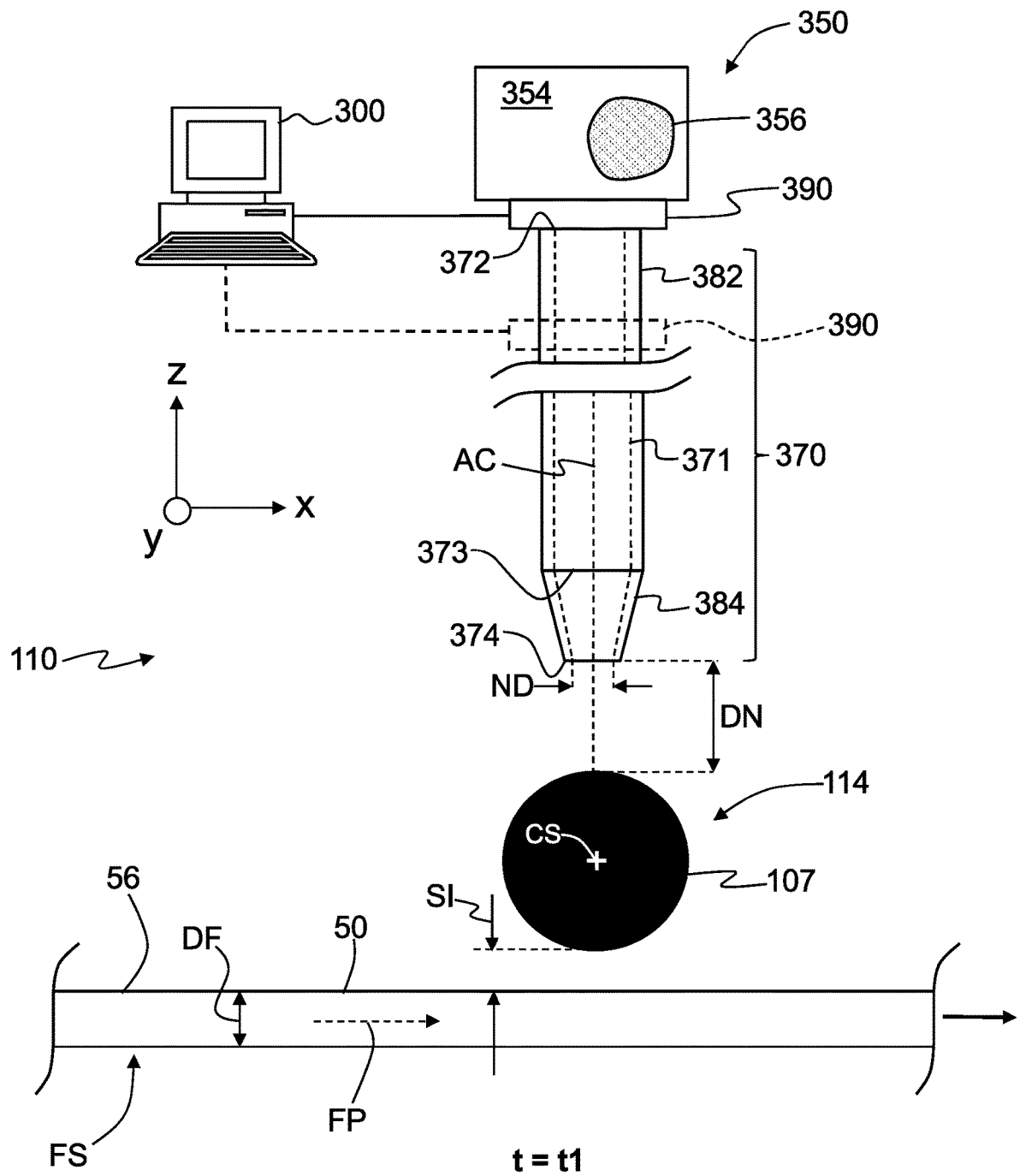
FIGS. 8A through 8C are schematic close-up diagrams of one of the three example ink stream dispenser units (110a) at three different times t=t1, t2 and t3, respectively, showing the gas jet of the ink stream deflection device moving the ink stream into the fiber path so that the ink stream intersects the optical fiber and then moving the fiber path back to its initial position by turning off or blocking the gas jet.

FIG. 8A is a close-up top-down view of an example of the ink stream deflection device 350. The ink stream deflection device 350 is arranged adjacent the ink stream 114, which in turn is arranged adjacent the fiber path FP and the fiber 50 that travels over the fiber path. The ink stream 114 flows along a central axis CS.

The example ink stream deflection device 350 includes a pressurized gas source 354 that contains a pressurized gas 356, such as air or nitrogen, oxygen, etc. The pressurized gas source 354 is pneumatically connected to a proximal end 372 of at least one gas conduit 370, which also has a distal end 374 that serves as an output end for the pressurized gas. The gas conduit 370 has a channel 371 and a central axis AC that runs down the center of the channel. In an example, the gas conduit 370 includes a main section 382 that includes the proximal end 372, and an opposite end 373. In an example, the main section 382 comprises a pipe or flexible tube. The example gas conduit 370 can include a nozzle 384 attached to the end 373 of the main section 382, wherein the nozzle tip defines the distal end 374. In another example, a section of the gas tube 370 adjacent the distal end 374 can be formed as a nozzle 384. The channel 371 of the gas conduit 370 can have a circular cross-sectional shape, an oval cross-section shape, elongate cross-sectional, rectangular cross-sectional shape, etc. The nozzle 384 can define a converging portion of the channel 371, as shown in FIG. 8A. The nozzle 384 (or the output end 374 of the channel 371 of the gas conduit 370) has a nozzle diameter ND.

Multiple gas conduits 370 can be used and a single gas conduit is shown and discussed by way of example and for ease of explanation.

In an example, the ink stream deflection device 350 includes a flow control device 390 arranged and configured to control the flow of the pressurized gas 356. In an example, the flow control device 390 is operably connected to and controlled by the controller 300.

In one example, the flow control device 390 controls the flow of pressurized gas 356 into the gas conduit 370 from the pressurized gas source 354, as shown in FIG. 8A. In another example, the flow control device 390 controls the flow of pressurized gas within the gas conduit, as shown by the dashed line flow control device in FIG. 8A. Examples of such flow control devices 390 comprises valve (e.g., an electro-mechanical or electromagnetic valve) of the type known and used in the art of pressurized pneumatic gas systems and that can be switched between an open (on) state and a closed (off) state with a control signal. In yet another example, the flow control device 390 controls the flow of pressurized gas 356 after it has exited the output end 374 of the gas conduit. The external flow of pressurized gas 356 leaving the nozzle 384 referred to as a gas jet 364.

FIG. 8A shows the ink stream deflection device 350 wherein the flow control device 390 is in an off (closed) state so that gas jet 356 does not reach the ink stream 114. FIG. 8A also shows the ink stream 114 spaced apart from the outer surface 56 of the fiber 50 by the distance SI. In an example, the distance SI is in the range from 0.5 mm to 3 mm, with 1 mm being a good example distance. The distance from the distal (output) end 374 of the gas conduit 370 to the ink stream 114 is denoted DN and is referred to herein as the "nozzle distance." In an example, the nozzle distance DN is in the range from 1 mm to 5 mm, with 2 mm being a good example distance.

Figure 8B:
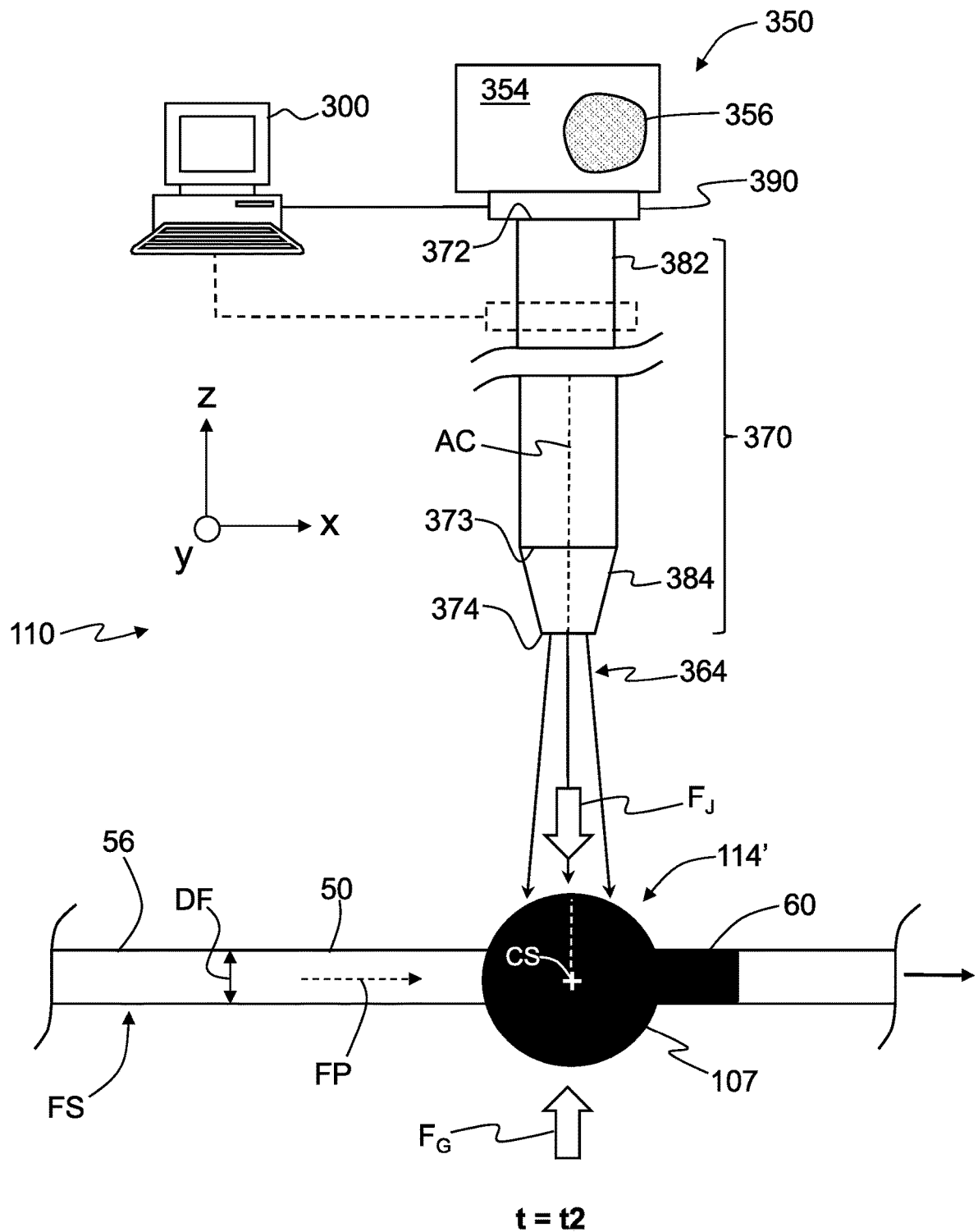

FIG. 8B is similar to FIG. 8A, except that the flow control device 390 is now in the on state (open position). In the present example where the flow control device 390 resides between the pressured gas source 354 and the gas conduit 370, the pressurized gas 356 can now flow from the pressurized gas source 354 into and through the gas conduit 370 and out the output end 374 of the gas conduit to form the gas jet 364. The gas jet 364 is directed at the ink stream 114 and is made incident thereon. In an example, the gas jet 364 is centered on the gas conduit central AC, which intersects the ink stream central axis CS so that the gas jet directly impinges upon the ink stream 114.

FIG. 8B is at a time t=t2 when the gas jet 364 has pushed the ink stream 114 in the −z direction into the fiber path FP so that the fiber 50 intersects the now deflected ink stream 114'. Note that the movement of the fiber 50 along the fiber path FP while the fiber is immersed in (on contact with) the deflected ink stream 114' initiates the formation of the mark 60 on the fiber.

The gas jet pressure $P_J$ (force per area) is selected so that the force $F_J$ on the ink stream 114 balances the restoring force of gravity $F_G$ that seeks to place the new (deflected) ink stream 114' back to its original path, which is in the vertical direction as defined by the direction of gravity. It is also noted that in an example the fiber 50 is located such that the portion of the deflected ink stream 114' that intersects the fiber is substantially intact, i.e., the portion of the deflected ink stream 114' has not exceeded the Rayleigh instability limit. Said differently, the fiber 50 is preferably contacted by the stable flow portion of the deflected ink stream 114'.

The precise operating parameters of the ink stream deflection device 350 depend on the type (diameter, velocity, viscosity, etc.) of the ink stream 114, the density of the gas 356, the size of the nozzle 384, desired deflection time $t_D$, desired immersion time $t_I$, etc. The amount of gas jet pressure $P_J$ for achieving a select amount of ink stream deflection for intersecting the fiber path FP while ensuring a stable flow portion of the deflected ink stream 114' can be readily established empirically by generating select amounts of the gas jet pressure for a given type of ink streams 114 and measuring the amount of deflection from the original ink stream path. In one example, the nozzle diameter ND can be in the range from 100 microns to 500 microns, the gas jet pressure $P_J$ can be in the range from 1 psi to 12 psi, and the ink stream 114 diameter DS is in the range from 100 microns to 500 microns.

Figure 8C:
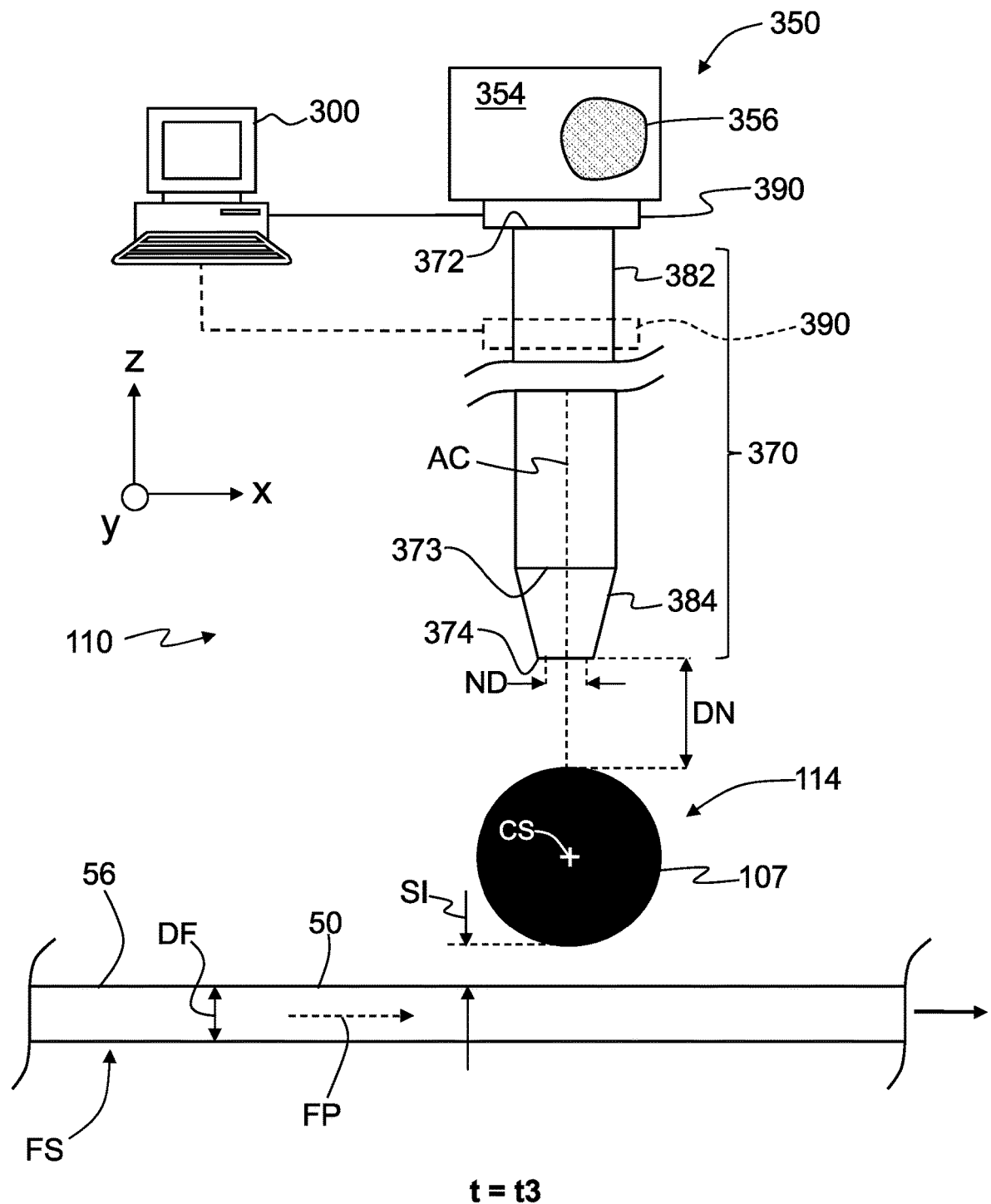

After a select period of time based on the type of mark(s) 60 being formed on the fiber 50, the controller 300 puts the flow control device 390 in the off state, which in one example terminates the gas jet 364 and in other examples prevents the gas jet from reaching the ink stream 114. The removal of the deflection force $F_J$ provided by the gas jet 364 allows the gravitation force $F_G$ to allow the deflected ink stream 114' to return being an undeflected ink stream 114, as shown in FIG. 8C.

The ink stream deflection process thus includes a deflection time $t_D$ over which the ink stream 114 is deflected from and returns to its original ink stream path. This defines the immersion time $t_I$ over which the fiber 50 intersects the deflected ink stream 114'. This creates a mark 60 on the fiber 50 whose axial length is determined by the immersion time $t_I$ and the fiber speed SF. The ink 107 from the deflected ink stream 114' deposits on the fiber outer surface 56 every time the fiber 50 resides at least partially within the deflected ink stream.

The above-described process is carried out for all of the ink stream dispenser units 110a, 110b, . . . to form the individual marks 60a, 60b, . . . that constitute a color-coded mark 60C (see FIG. 2D).

Apparatus Set Up and Method of Operation for Marking

With reference again to FIG. 1A, as part of the setting up of apparatus 10, the storage reel 30 with the unmarked fiber 50 is loaded into the payout module 20. The unmarked fiber 50 is then fed through the nearby drive pulley 36D. The fiber 50 is led over the fiber path FP through the marking unit 100 and past the fiber positioning device 250, and then to the position sensor 120 and through the interior 138 of the dryer unit 130. The fiber 50 is then led around the guide pulleys 36G that reside downstream of the dryer unit 130. The fiber 50 is then led under the mark counter 150, through the overcoat applicator 170 and then through the curing system 190. The fiber 50 is then led around the drive pulley 36D of the take-up module 220 and onto the take-up reel 230.

Once the fiber 50 is set up to travel over the fiber path FP through the apparatus 10 and its various components as described above, the controller 300 activates the drive pulleys 36D of the payout module 20 and the take-up module 220 to start moving the fiber 50 along the fiber path at a select speed SF.

Once the fiber 50 ramps up to the select fiber speed SF, the marking unit 100 and the fiber positioning device 250 or the ink stream deflection device(s) 350 is/are activated (e.g., via the controller 300). With reference to FIG. 2C, this includes causing the ink stream dispenser units 110a, 110b, . . . to dispense from its output end 112 the ink 107a, 107b, . . . in the form of the ink streams 114a, 114b, . . . . As described above, in one method, as the fiber 50 moves along the fiber path FP, the fiber positioning device 250 acts to intermittently (e.g., periodically) move the fiber into and out of the ink streams 114a, 114b, . . . as described above so that the individual marks 60a, 60b, . . . are formed on the fiber 50 to define the color-coded mark 60C. In another method, the ink streams 114a, 114b, . . . are deflected into the fiber path FP using one or more ink stream deflection devices 350 to form the individual marks 60a, 60b, . . . on the fiber 50 that define the color-coded marks 60C. Note that for the individual marks 60a, 60b . . . to be as close together, the deflection of the ink streams 114a, 114b, . . . is preferably performed simultaneously.

Once the individual marks 60a, 60b, . . . are formed on the unmarked fiber 50 to form the color-coded mark 60C, the corresponding ink 107a, 107b, . . . needs to be dried so that the marks become substantially permanent. This is accomplished by passing the marked fiber 50 exiting the marking unit 100 at the output end 104 through the interior 138 of the dryer tube 136 of the dryer unit 130. In one example, the dryer unit 130 is configured to flow hot air through the interior 138 of the dryer tube 136 to dry the inks 107a, 107b, . . . that forms the marks 60a, 60b, . . . . In a particular example, the hot air flashes off substantially all of solvent (e.g., MEK) from the given ink 107 to leave pigment on the outer surface 56. Evaporation of the solvent improves the adhesion between the given mark 60 and the outer surface 56 of the fiber 50. The dryer unit 130 is not limited to an air-based dryer and in other examples the drying can be accomplished using other means, such as microwaves, infrared radiation, ultraviolet radiation, convected hot air, etc.

With reference again to FIG. 1A, the marked fiber 50 exits the output end 134 of the most downstream dryer unit 130 and then passes by the marking counter 150, which counts the number of individual marks as well as the number of color-coded marks, e.g., as measured number densities. The measured number densities from the mark counter 150 are sent to the controller 300 and compared to the corresponding expected (selected) number density. The mark counter 150 is used for quality control, i.e., to ensure that the correct number density of both individual marks 60 and color-coded marks 60C is being formed, to spot any missing marks 60, to find extra marks, and to identify incorrectly formed marks, etc. In examples, the number density N of color-coded marks per meter is in the range from 1 to 40 or from 3 to 10. In other examples, the number density N of color-coded marks per meter is in the range from 18 to 22 while in another example is in the range from 3 to 5.

With continuing reference to FIG. 1A and also to the close-up view of FIG. 9, the marked fiber 50 continues to the overcoat applicator 170 of the overcoating system 199. FIG. 10 is a cross-sectional view of the marked fiber 50 taken at one of the marks 60 (namely, mark 60b) of the color-coded mark 60C at the location b-b in FIG. 10, and illustrates an example ring-type mark 60 that makes a complete circuit of the optical fiber circumference (closed ring mark).

The overcoat applicator 170 deposits an overcoat material 176 on the outer surface 56 of the marked fiber 50 to form a covered or overcoated fiber. The overcoat material 176 forms a protective overcoat 180 over the entire outer surface 56, including any marks 60 thereon. In an example, the overcoat applicator 170 comprises a coating tube 178 with an interior 179 through with the fiber path FP passes. The overcoat material 176 is provided to the interior 179 so that the fiber 50 passes through the overcoat material 176, which is the substantially uniformly applied around the circumference (or portion thereof) of the outer surface 56 of the marked fiber.

In an example, the overcoat material 176 is at least semi-transparent so that the marks 60 are visible through the overcoat 180. Further in an example, the overcoat material 176 can be colored (e.g., via a pigment) to define a colored overcoat 180, e.g., yellow for submarine fibers 50. In an example, the overcoat material 176 is light-curable, e.g., by ultraviolet (UV) radiation. In an example, the overcoat material 176 comprises a UV-curable acrylate. The main purpose of the overcoat 180 is to protect the marks 60 from external wear, such as from handling by field personnel, abrasion or rubbing against adjacent fibers or cable surfaces, etc. In an example, the individual marks 60 have colors different from the colored overcoat material so that the marks can be seen through the overcoat material.

With continuing reference to FIG. 1A and to FIG. 9, upon exit from overcoat applicator 170, the fiber 50 is passed through the curing system 190 to cure the overcoat material 176. In an example, the curing system 190 is light based and is configured to generate actinic light 196 (e.g., UV radiation) that irradiates the overcoat material 176 and cures it to form overcoat 180. In an example, the curing system 190 has an interior 195 and the actinic light 196 is incident upon the overcoat material 176 from substantially 360°. FIG. 11 is similar to FIG. 10 and shows the color-coded marked fiber 50 with the protective overcoat 180.

Figure 12:
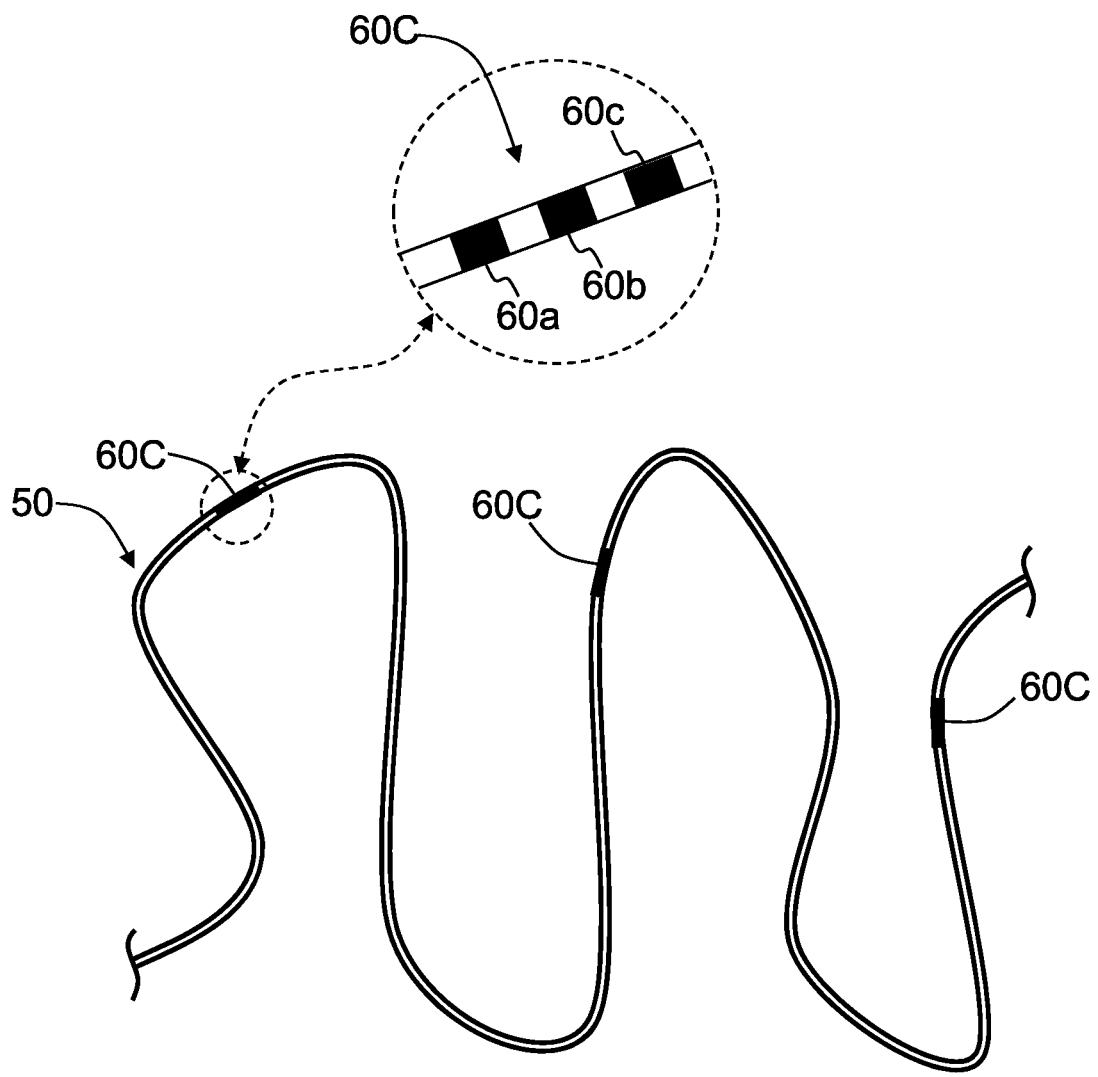
FIG. 12 is a schematic diagram of a section of the color-coded marked and overcoated optical fiber showing the spaced-apart color-coded marks formed using the apparatus and methods disclosed herein, with the close-up inset shown by way of example three individual colored marks that constitute each color-coded mark.

FIG. 12 is a schematic diagram of a section of color-coded marked fiber 50 (or color-coded marked and overcoated fiber) showing spaced apart color-coded marks 60C formed using the apparatus and methods described herein. The close-up inset shows the color-coded mark 60C constituted by individual marks 60*a*, 60*b* and 60*c*, at least two of which have different colors. Three individual marks 60*a*, 60*b* and 60*c* are shown by way of example, and in general two or more marks 60*a*, 60*b*, . . . can be employed.

Aspect 1 of the description is:
A method forming a color-coded mark on an optical fiber having an outer surface and a center line that defines an axial direction of the optical fiber, comprising:
 forming two or more ink streams that reside substantially in a row and in close proximity to one another, with at least first and second ones of the two or more ink streams having first and second colors that are different from one another;
 moving the optical fiber over a fiber path that resides adjacent the two or more ink streams; and
 causing the fiber path and the two or more ink streams to briefly intersect to form two or more axially spaced apart marks on the outer surface of the optical fiber, with at least first and second ones of the two or more axially spaced apart marks having the first and second different colors of the first and second ink streams.

Aspect 2 of the description is:
The method according to Aspect 1, wherein the two or more axially spaced marks constitute the color-coded mark, and wherein the causing the fiber path and the two or more ink streams to intersect is performed intermittently to form multiple axially spaced color-coded marks on the optical fiber.

Aspect 3 of the description is:
The method according to Aspect 1 or 2, wherein the causing the fiber path and the two or more ink streams to briefly intersect comprises briefly moving the fiber path into the two or more ink streams.

Aspect 4 of the description is:
The method according to Aspect 1 or 2, wherein the causing the fiber path and the two or more ink streams to intersect comprises briefly deflecting the two or more ink streams into the fiber path.

Aspect 5 of the description is:
The method according to any of Aspects 1-4, wherein each of the two or more ink streams has a different color from the other ink streams.

Aspect 6 of the description is:
The method according to any of Aspects 1-5, wherein each of the two or more axially spaced marks has an axial length between 1 mm and 10 mm.

Aspect 7 of the description is:
The method according to any of Aspects 1-6, wherein adjacent ones of the two or more axially spaced marks have an axial spacing between 1 mm and 20 mm.

Aspect 8 of the description is:
The method according to any of Aspects 1-7, wherein the two or more axially spaced marks are initially formed as wet marks, and further comprising drying the wet marks to form dry marks.

Aspect 9 of the description is:
The method according to Aspect 8, further comprising forming a protective overcoat over the outer surface of the optical fiber and the dry marks.

Aspect 10 of the description is:
The method according to any of Aspects 1-9, wherein the moving of the optical fiber over the fiber path includes moving the optical fiber at a line speed of at least 10 meters per second.

Aspect 11 of the description is:
The method according to Aspect 10, wherein the line speed is at least 50 meters per second.

Aspect 12 of the description is:
The method according to Aspect 1, further comprising forming a series of axially spaced multiple color-coded marks on the outer surface of the optical fiber.

Aspect 13 of the description is:
The method according to Aspect 12, wherein adjacent ones of the multiple color-coded marks have an axial spacing in the range from 50 mm to 250 mm.

Aspect 14 of the description is:
A method of marking an optical fiber with a color-coded mark, comprising:
 causing the optical fiber to move over a fiber path, wherein the moving optical fiber has an outer surface, and wherein the fiber path resides adjacent multiple ink streams arranged closely proximate each other, wherein at least two of the multiple ink streams have a different first and second colors;
 forming on the outer surface of the moving optical fiber multiple spaced apart wet ink marks by causing the fiber path and the multiple ink streams to briefly intersect, wherein at least two of the spaced apart wet ink marks have the first and second different colors;
 drying the multiple spaced apart wet ink marks at a drying location to form dried spaced apart ink marks that constitute the color-coded mark; and
 applying a substantially transparent protective coating over the dried ink marks and the outer surface of the moving optical fiber, wherein the dried ink marks are visible through the substantially transparent protective coating.

Aspect 15 of the description is:
The method according to Aspect 14, wherein the causing the fiber path and the multiple ink streams to briefly intersect is performed intermittently to form multiple axially spaced color-coded marks on the optical fiber.

Aspect 16 of the description is:
The method according to Aspect 15, wherein the multiple axially spaced color-coded marks have a number density in the range of 1 to 40 per meter.

Aspect 17 of the description is:
The method according to Aspect 16, wherein the number density is in the range from 18-22 per meter.

Aspect 18 of the description is:
The method according to Aspect 16, wherein the number density is in the range from 3 to 5 per meter.

Aspect 19 of the description is:
The method according to any of Aspects 15-18, wherein adjacent ones of the multiple axially spaced color-coded marks have an axial spacing in the range from 50 mm to 250 mm.

Aspect 20 of the description is:
The method according to any of Aspects 14-19, wherein the causing the fiber path and the multiple more ink streams to briefly intersect comprises briefly moving the fiber path into the multiple ink streams.

Aspect 21 of the description is:

The method according to any of Aspects 14-19, wherein the causing the fiber path and the multiple ink streams to briefly intersect comprises briefly deflecting each of the multiple ink streams into the fiber path.

Aspect 22 of the description is:

The method according to any of Aspects 14-21, wherein each of the multiple ink streams has a different color from the other ink streams.

Aspect 23 of the description is:

The method according to any of Aspects 14-22, wherein each of the multiple axially spaced wet marks has an axial length of between 1 mm and 10 mm.

Aspect 24 of the description is:

The method according to any of Aspects 14-23, wherein adjacent ones of the axially spaced wet marks have an axial spacing of between 1 mm and 20 mm.

Aspect 25 of the description is:

The method according to any of Aspects 14-24, wherein the moving of the optical fiber over the fiber path includes moving the optical fiber at a line speed of at least 10 meters per second.

Aspect 26 of the description is:

The method according to Aspect 25, wherein the line speed is at least 50 meters per second.

Aspect 27 of the description is:

An optical fiber marking apparatus for marking an optical fiber having an outer surface, comprising relative to a fiber path:
- a payout module and a take-up module respectively configured to pay out and take up the optical fiber while moving the optical fiber over the fiber path at a fiber speed;
- a marking unit disposed downstream of the payout module and at a marking location, the marking unit configured to form multiple ink streams adjacent the fiber path, with at least two of the multiple ink streams having different colors; and
- a fiber positioning device operably disposed relative to the marking unit and that is adapted to intermittently position the optical fiber to intersect the multiple ink streams so that ink from the multiple ink streams forms groups of spaced apart marks on the outer surface of the optical fiber at the marking location, wherein each group of spaced apart marks constitutes a color-coded mark.

Aspect 28 of the description is:

The optical fiber marking apparatus according to Aspect 27, wherein the fiber positioning device comprises a roller having a perimeter and at least one position adjustment feature at the perimeter.

Aspect 29 of the description is:

The optical fiber marking apparatus according to Aspect 28, wherein the roller comprises a circular roller having a circular perimeter, and wherein the at least one position adjustment feature comprises at least one protrusion.

Aspect 30 of the description is:

The optical fiber marking apparatus according to Aspect 28, wherein the roller comprises an eccentric roller having an eccentric perimeter portion that comprises the at least one position adjustment feature.

Aspect 31 of the description is:

The optical fiber marking apparatus according to any of Aspects 27-30, wherein the fiber path is substantially perpendicular to the multiple ink streams.

Aspect 32 of the description is:

The optical fiber marking apparatus according to any of Aspects 27-31, wherein each of the multiple ink streams has a diameter DS in the range 20 $\mu m \leq DS \leq 5000$ $\mu m$.

Aspect 33 of the description is:

The optical fiber marking apparatus according to any of Aspects 27-32, wherein the marks are formed as wet marks, and further comprising:
- a dryer unit configured to dry the wet marks to form dried marks.

Aspect 34 of the description is:

The optical fiber marking apparatus according Aspect 33, further comprising:
- an overcoating system disposed downstream of the dryer unit and configured to coat the dried marks and the outer surface of the optical fiber.

Aspect 35 of the description is:

An optical fiber marking apparatus for marking an optical fiber having an outer surface, comprising relative to a fiber path:
- a payout module and a take-up module respectively configured to pay out and take up the optical fiber while moving the optical fiber over the fiber path at a fiber speed;
- a marking unit disposed downstream of the payout module and at a marking location, the marking unit configured to form multiple ink streams adjacent the fiber path, with at least two of the multiple ink streams having different colors; and
- at least one ink stream deflection device operably disposed relative to the multiple ink streams and that is adapted to intermittently deflect the multiple ink streams to intersect the optical fiber so that the multiple ink streams form groups of spaced apart marks on the outer surface of the optical fiber at the marking location, wherein each group of spaced apart marks constitutes a color-coded mark.

Aspect 36 of the description is:

The optical fiber marking apparatus according to Aspect 35, wherein the at least one ink stream deflection device intermittently generates at least one gas jet directed at each of the multiple ink streams.

Aspect 37 of the description is:

The optical fiber marking apparatus according to Aspect 35, wherein the at least one ink stream deflection device comprises multiple ink stream deflection devices, with respective ones of the multiple ink stream deflection devices operably arranged relative to a corresponding one of the multiple ink streams.

Aspect 38 of the description is:

The optical fiber marking apparatus according to any of Aspects 35-37, wherein the fiber path is substantially perpendicular to the multiple ink streams.

Aspect 39 of the description is:

The optical fiber marking apparatus according to any of Aspects 35-38, wherein each of the multiple ink streams has a diameter DS in the range 20 $\mu m \leq DS \leq 5000$ $\mu m$.

Aspect 40 of the description is:

The optical fiber marking apparatus according to any of Aspects 35-39, wherein the marks are formed as wet marks, and further comprising:
- a dryer unit configured to dry the wet marks to form dried marks.

Aspect 41 of the description is:
The optical fiber marking apparatus according Aspect 40, further comprising:

an overcoating system disposed downstream of the dryer unit and configured to coat the dried marks and the outer surface of the optical fiber.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming a color-coded mark on an optical fiber having an outer surface and a center line that defines an axial direction of the optical fiber, comprising:

forming two or more continuous ink streams that reside substantially in a row and in close proximity to one another, with at least first and second ones of the two or more continuous ink streams having first and second colors that are different from one another;

moving the optical fiber in a first direction over a fiber path that resides adjacent the two or more continuous ink streams, the moving optical fiber not intersecting the two or more continuous ink streams as the two or more continuous ink streams are flowing; and causing the moving optical fiber to simultaneously intersect the first and second ones of the two or more continuous ink streams to respectively form first and second axially spaced apart marks on the outer surface of the optical fiber, the first and second axially spaced apart marks respectively having the first and second colors of the first and second continuous ink streams.

2. The method according to claim 1, wherein the two or more axially spaced marks constitute the color-coded mark, and wherein the causing the moving optical fiber and the first and second ones of the two or more continuous ink streams to intersect is performed intermittently to form multiple axially spaced color-coded marks on the outer surface of the optical fiber.

3. The method according to claim 1, wherein the causing the moving optical fiber and the first and second ones of the two or more continuous ink streams to intersect comprises briefly moving the optical fiber in a second direction transverse to the first direction.

4. The method according to claim 1, wherein the causing the fiber path and the two or more ink streams to intersect comprises briefly deflecting the two or more ink streams into the fiber path.

5. The method according to claim 1, wherein each of the two or more continuous ink streams has a different color from each of the other of the two or more continuous ink streams.

6. The method according to claim 1, wherein each of the two or more axially spaced marks has an axial length between 1 mm and 10 mm.

7. The method according to claim 1, wherein adjacent ones of the two or more axially spaced marks have an axial spacing between 1 mm and 20 mm.

8. The method according to claim 1, wherein the two or more axially spaced marks are initially formed as wet marks, and further comprising drying the wet marks to form dry marks.

9. The method according to claim 8, further comprising forming a protective overcoat over the outer surface of the optical fiber and the dry marks.

10. The method according to claim 1, wherein the moving of the optical fiber over the fiber path includes moving the optical fiber at a line speed of at least 10 meters per second.

11. The method of claim 1, wherein the optical fiber includes a glass fiber and a coating, the coating including a low-modulus primary layer adjacent the glass fiber and a high-modulus secondary layer adjacent the low-modulus primary layer, the high-modulus secondary layer defining the outer surface.

12. An optical fiber marking apparatus for marking an optical fiber having an outer surface, comprising relative to a fiber path:

a payout module and a take-up module respectively configured to pay out and take up the optical fiber while moving the optical fiber over the fiber path at a fiber speed;

a marking unit disposed downstream of the payout module at a marking location, the marking unit configured to form multiple continuous ink streams adjacent the fiber path, with first and second ones of the multiple continuous ink streams having different colors; and a fiber positioning device operably disposed relative to the marking unit, the fiber positioning device adapted to intermittently adjust the position of the optical fiber from a non-marking position to a marking position at the marking location, the optical fiber not intersecting the first and second ones of the multiple continuous ink streams in the non-marking position as the first and second ones of the multiple continuous ink streams are flowing, the optical fiber intersecting the first and second ones of the multiple continuous ink streams in the marking position as the first and second ones of the multiple continuous ink streams are flowing.

13. The optical fiber marking apparatus according to claim 12, wherein the fiber positioning device comprises a roller having a perimeter and at least one position adjustment feature at the perimeter.

14. The optical fiber marking apparatus according to claim 13, wherein the roller comprises a circular roller having a circular perimeter, and wherein the at least one position adjustment feature comprises at least one protrusion.

15. The optical fiber marking apparatus according to claim 13, wherein the roller comprises an eccentric roller having an eccentric perimeter portion that comprises the at least one position adjustment feature.

16. The optical fiber marking apparatus according to claim 12, wherein the fiber path is substantially perpendicular to the multiple continuous ink streams.

17. The optical fiber marking apparatus according to claim 12, wherein each of the multiple continuous ink streams has a diameter DS in the range 20 µm≤DS≤5000 µm.

18. The optical fiber marking apparatus according to claim 12, wherein ink from the first of the multiple continuous ink streams forms a first mark on the outer surface of the optical fiber and ink from the second of the multiple continuous ink streams forms a second mark on the outer surface of the optical fiber, the first and second marks differ in color and are formed as wet marks, and further comprising:

a dryer unit configured to dry the wet marks to form dried marks.

19. The optical fiber marking apparatus according claim 18, further comprising:
an overcoating system disposed downstream of the dryer unit and configured to coat the dried marks and the outer surface of the optical fiber.

* * * * *

UNITED STATES PATENT AND TRADEMARK OFFICE
CERTIFICATE OF CORRECTION

| | |
|---|---|
| PATENT NO. | : 11,891,330 B2 |
| APPLICATION NO. | : 17/139083 |
| DATED | : February 6, 2024 |
| INVENTOR(S) | : Aditya Kaimal et al. |

It is certified that error appears in the above-identified patent and that said Letters Patent is hereby corrected as shown below:

In the Claims

In Column 23, Line 1, in Claim 19, delete "according" and insert -- according to --.

Signed and Sealed this
Twenty-seventh Day of August, 2024

Katherine Kelly Vidal
*Director of the United States Patent and Trademark Office*